United States Patent
Ortiz Egea et al.

(10) Patent No.: US 11,748,900 B2
(45) Date of Patent: Sep. 5, 2023

(54) GRAPHICAL TOF PHASE UNWRAPPING

(71) Applicant: Microsoft Technology Licensing, LLC, Redmond, WA (US)

(72) Inventors: Sergio Ortiz Egea, San Jose, CA (US); Travis Jon Perry, Los Gatos, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 39 days.

(21) Appl. No.: 17/317,692

(22) Filed: May 11, 2021

(65) Prior Publication Data

US 2022/0366583 A1 Nov. 17, 2022

(51) Int. Cl.
    *G06T 7/521* (2017.01)
    *G06V 10/75* (2022.01)
    *G06F 18/2134* (2023.01)
    *G06F 18/2137* (2023.01)

(52) U.S. Cl.
    CPC .......... *G06T 7/521* (2017.01); *G06F 18/2134* (2023.01); *G06F 18/2137* (2023.01); *G06V 10/75* (2022.01); *G06V 10/751* (2022.01); *G06T 2207/20041* (2013.01)

(58) Field of Classification Search
    CPC . G06T 7/50; G06T 7/521; G06T 2207/20041; G06T 7/557; G01S 17/08; G01S 7/4808; G01S 17/06; G01S 17/46; G01S 17/42; G01S 13/08; G01S 17/00; G01S 17/02; G01S 17/88; G01S 17/89; G01S 17/894; G01S 7/4865; G01S 7/4911; G01S 7/4912; G01S 17/32; G01S 17/36; G01S 17/34; G01S 17/10; G01S 17/26; G01S 7/4915; G01S 7/491; G01S 15/32; G01B 11/2527; G06V 10/75; G06V 10/10; G06V 10/20; G06V 30/19007; G06V 30/192; G06V 30/196; G06V 30/198; G06V 10/751; G06V 30/19013; G06F 18/00;

(Continued)

(56) References Cited

U.S. PATENT DOCUMENTS

2018/0011195 A1 1/2018 Perry et al.

OTHER PUBLICATIONS

"International Search Report and Written Opinion Issued in PCT Application No. PCT/US22/024148", dated Aug. 17, 2022, 15 Pages.

(Continued)

*Primary Examiner* — Sumati Lefkowitz
*Assistant Examiner* — Michael Adam Shariff
(74) *Attorney, Agent, or Firm* — Alleman Hall Creasman & Tuttle LLP

(57) ABSTRACT

One example provides a computing system comprising a depth sensor comprising a plurality of pixels, and a storage machine holding instructions executable by a logic machine to, for each pixel, make K phase measurements to form a set of noisy phase measurements, determine a location at which a projection line that passes through the set of noisy phase measurements in a K-dimensional phase space passes through a lower dimensional plane, the projection line being parallel to a noise free phase evolution line, compare the location to a plurality of independent terms of a predetermined matrix of points in the lower dimensional plane, locate a corresponding set of noiseless phase orders by using a selected set of independent terms to reference a look-up table, determine a distance value for the pixel based upon the corresponding set of noiseless phase orders, and output the distance value for the pixel.

11 Claims, 19 Drawing Sheets

(58) Field of Classification Search
CPC ... G06F 18/22; G06F 18/2134; G06F 18/2137
See application file for complete search history.

(56) References Cited

OTHER PUBLICATIONS

"Invitation To Pay Additional Fees Issued in PCT Application No. PCT/US22/024148", dated Jun. 24, 2022, 9 Pages.

FIRST INDEPENDENT TERM

1200

| | | 1 | 2 | 3 | 4 | 5 | 6 | 7 | 8 | 9 | 10 | 11 | 12 |
|---|---|---|---|---|---|---|---|---|---|---|---|---|---|
| SECOND INDEPENDENT TERM | 1 | 0 | 0 | 0 | 0 | 0 | 0 | 60 | 76 | 15 | 0 | 0 | 0 |
| | 2 | 0 | 0 | 0 | 8 | 25 | 38 | 50 | 65 | 2 | 20 | 0 | 0 |
| | 3 | 0 | 0 | 58 | 74 | 13 | 29 | 42 | 53 | 68 | 5 | 0 | 0 |
| | 4 | 0 | 36 | 48 | 63 | 1 | 19 | 32 | 44 | 55 | 71 | 9 | 0 |
| | 5 | 11 | 27 | 40 | 52 | 67 | 4 | 22 | 34 | 46 | 59 | 75 | 14 |
| | 6 | 78 | 17 | 31 | 43 | 54 | 70 | 7 | 24 | 37 | 49 | 64 | 0 |
| | 7 | 66 | 3 | 21 | 33 | 45 | 57 | 73 | 12 | 28 | 41 | 0 | 0 |
| | 8 | 0 | 69 | 6 | 23 | 35 | 47 | 62 | 79 | 18 | 0 | 0 | 0 |
| | 9 | 0 | 56 | 72 | 10 | 26 | 39 | 51 | 0 | 0 | 0 | 0 | 0 |
| | 10 | 0 | 0 | 61 | 77 | 16 | 30 | 0 | 0 | 0 | 0 | 0 | 0 |

FIG. 12

GRAPHICAL TOF PHASE UNWRAPPING

BACKGROUND

Depth sensing systems, such as time-of-flight (ToF) cameras, may be used to produce a depth image of an environment, with each pixel of the depth image representing a distance to a corresponding point in the environment. In ToF imaging, a distance to a point on an imaged surface in the environment is determined based on a length of a time interval in which amplitude-modulated light emitted by the depth imaging system travels out to that point and then returns back to a sensor of the depth imaging system.

SUMMARY

Examples are disclosed that relate to determining phase orders for phase data in a depth imaging system for use in unwrapping the phase data to determine a depth value for a pixel. One example provides a computing system comprising a depth sensor comprising a plurality of pixels, each pixel configured to sense light, an illumination source configured to output light, a logic machine, and a storage machine holding instructions executable by the logic machine to control the illumination source to output amplitude-modulated light at K modulation frequencies, where K is an integer greater than or equal to two. The instructions are further executable to, for each pixel of the plurality of pixels, make K phase measurements each at a different modulation frequency of the K modulation frequencies to form a set of noisy phase measurements, determine a location at which a projection line that passes through the set of noisy phase measurements in a K-dimensional phase space passes through a lower dimensional plane in the K-dimensional phase space, the projection line being parallel to a noise free phase evolution line, compare the location to a plurality of independent terms of a predetermined matrix of points in the lower dimensional plane, each point representing a corresponding predetermined noisy phase order set with known noise, and select a set of independent terms. The instructions are further executable to locate a corresponding set of noiseless phase orders by using the set of independent terms to reference a look-up table, determine a distance value for the pixel based upon the corresponding set of noiseless phase orders, and output the distance value for the pixel.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 12 is an example look-up table that shows phase order points as elements of a matrix where the rows and columns represent independent terms corresponding to the lines of FIG. 10.

DETAILED DESCRIPTION

Figure 1A:
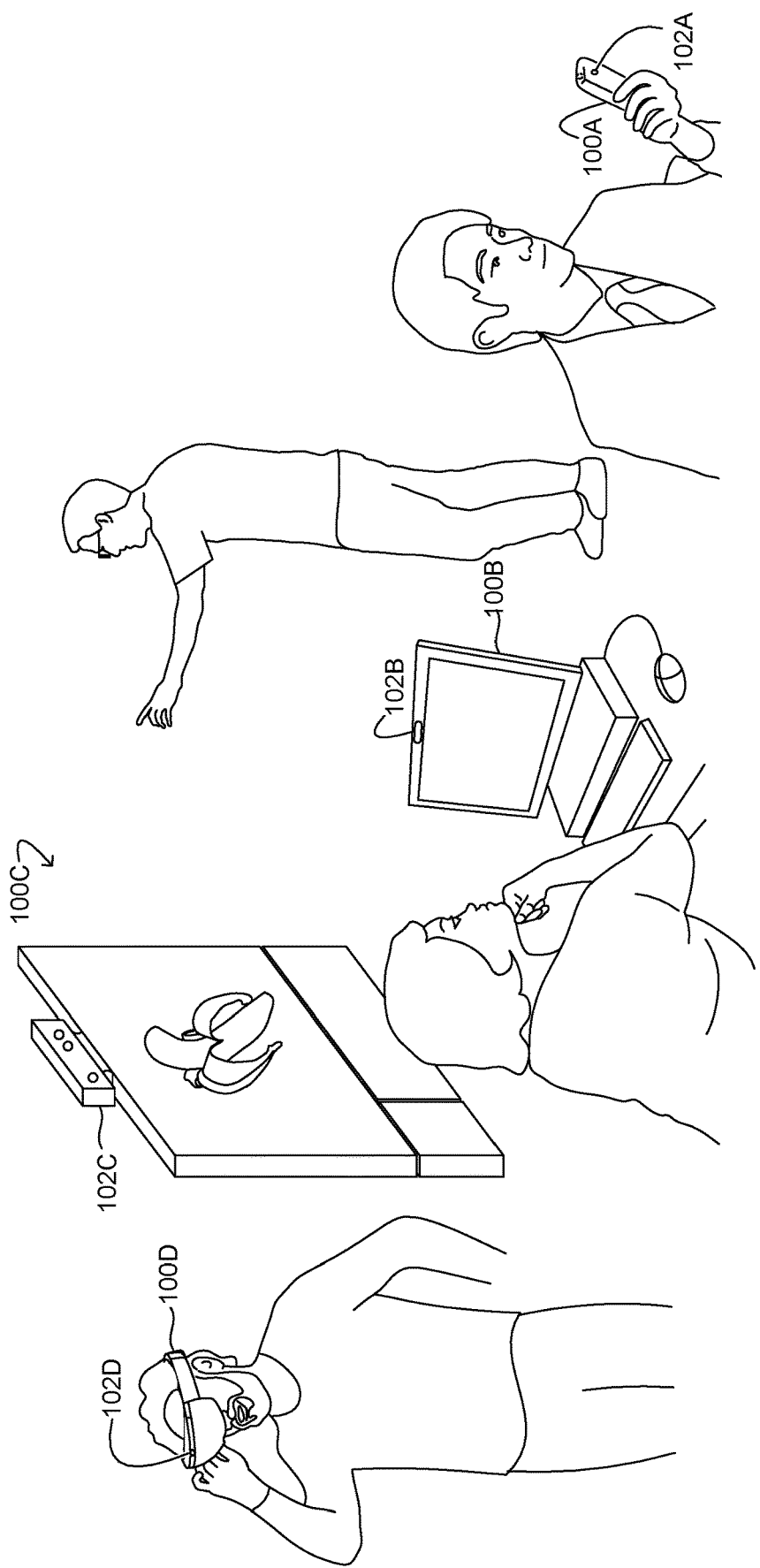
FIGS. 1A-1B show example electronic devices comprising time-of-flight (ToF) cameras.

'Phase-based' optical ToF imaging is a variant of ToF imaging in which depth is computed based on the phase shift of amplitude modulated light reflected back from a subject. The phase shift is proportional to the subject's distance modulo the wavelength of the modulation frequency.

However, due to the periodic nature of the modulated light, the measured total phase repeats (or wraps) every $2\pi$. For example, given a measured phase $\tilde{\phi}_k$, the total phase is $\tilde{\phi}_k\, 2\pi n_k$, where $n_k$ is an integer. Since $n_k$ cannot be directly measured via a phase based ToF pixel, the total phase, and thus the actual distance related to the measurement, is ambiguous. As the measured phase ranges from 0 to $2\pi$, the range of unambiguity in the determined distance is from 0 to $$\frac{c}{2f}.$$

To address this issue, two or more different modulation frequencies k can be used to increase the range of unambiguity, allowing the phase information to be "unwrapped" for the accurate determination of distance. Phase unwrapping, or 'de-aliasing,' is a way to disambiguate the phase shift data and identify a distance value by illuminating the scene with amplitude-modulated light of a plurality of different frequencies, as the distance ambiguities are different for each frequency of illumination light. This extends the unambiguity range to a distance corresponding to a common beat frequency for all frequencies used.

However, due to noise in the measured phases, the phase unwrapping computation may not be straightforward, as the phase number $n_k$ (the number of the phase wrapping) for a measurement made at a modulation frequency k may be uncertain. At wrapping points, noise may cause a phase number to appear to have wrapped into a next phase order, which can result in an inaccurate determination of distance.

Accordingly, examples are disclosed relating to performing phase unwrapping to determine distance values for depth image data by generating a matrix of points and a look-up table for use in ToF phase unwrapping, and utilizing the matrix of points and look-up table to determine a phase order set and associated depth value for a noisy phase point. Briefly, a K-dimensional phase point representing K noisy phase measurements is projected onto a lower dimensional plane and compared to a predetermined matrix of points to identify independent terms. A most likely phase order set is then selected by using the independent terms to reference a look-up table. Then, a distance value is determined and output based on the most likely phase order set. The matrix of points is generated by projecting a plurality of total phase points—representing computationally-derived noisy phase orders—onto a lower dimensional plane, discussed in more detail below. An associated look-up table is further generated by plotting independent terms through the matrix of points. The examples disclosed herein may achieve improved efficiency with fast computation and low memory usage compared to graphical phase unwrapping methods that use optimization to determine a most likely phase order set.

Figure 1B:
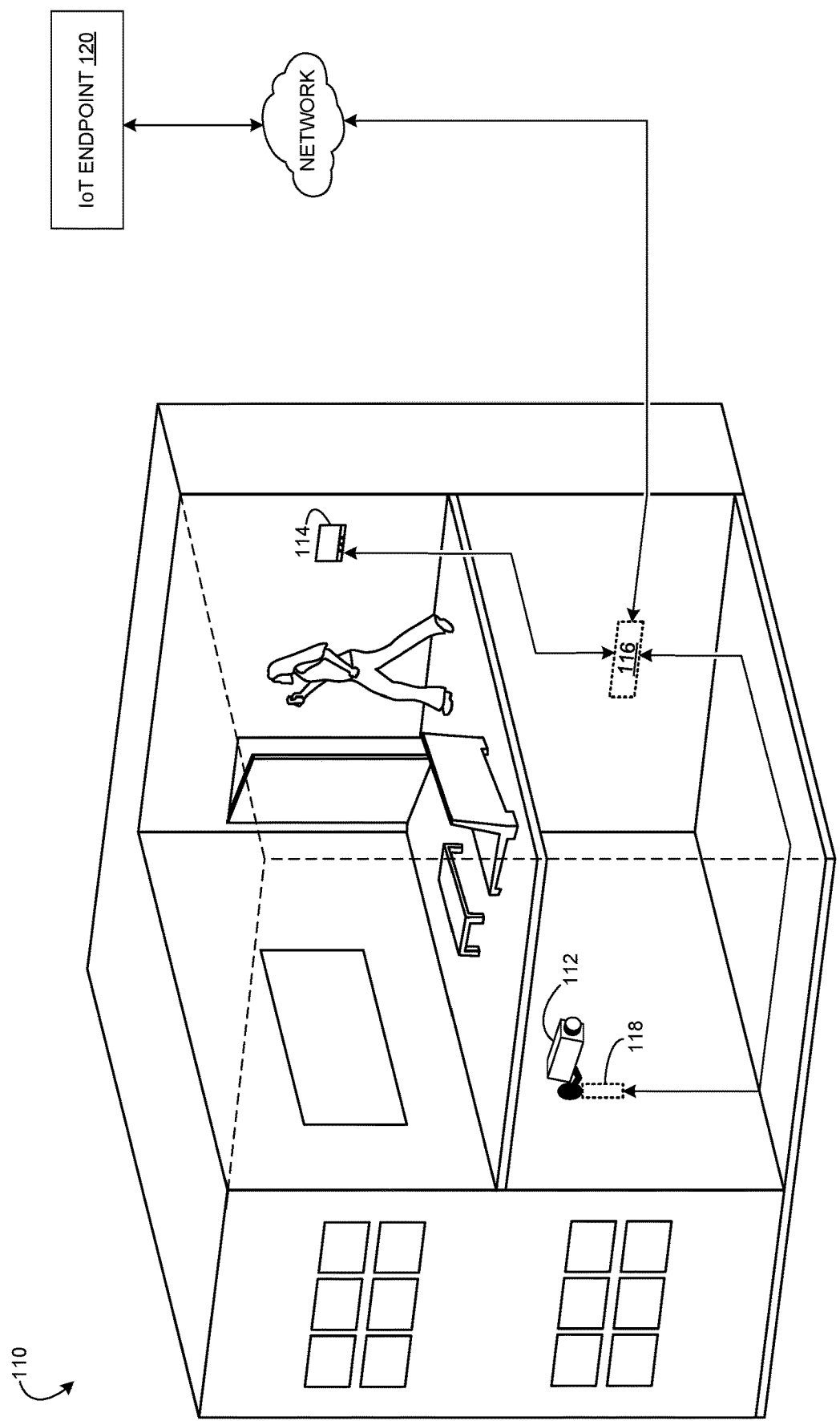

Prior to discussing these examples in detail, FIGS. 1A-B illustrates various different example electronic devices 100A-D that may employ phase-based ToF depth imaging systems. Referring first to FIG. 1A, device 100A is a smartphone that includes a camera 102A. Device 100B is a personal computer that includes a web camera 102B. Device 100C is a video game system that includes a peripheral 3D camera 102C. Device 100D is a virtual-reality headset that includes a 3D camera 102D. FIG. 1B shows an example use environment 110 including a camera 112 that may employ phase-based ToF depth imaging. Camera 112 sends data to an IoT ("Internet of Things") endpoint computing device 120 via a communication hub 116 that also connects to other IoT devices, such as a thermostat 114. Camera 112 may include optional controller 118. Devices 100A-D and camera 112 may employ phase-based optical ToF imaging in industrial and/or consumer applications, including device automation applications, gaming and virtual reality applications, and biometric and facial recognition applications. Such application may be executed local to the depth imaging system, on a remote computing system (e.g., IoT endpoint computing device 120), and/or on an edge device at a local network edge to bring cloud computing functionality closer to the local network. It will be appreciated that phase-based ToF depth imaging may be used in any other suitable electronic device.

Figure 2:
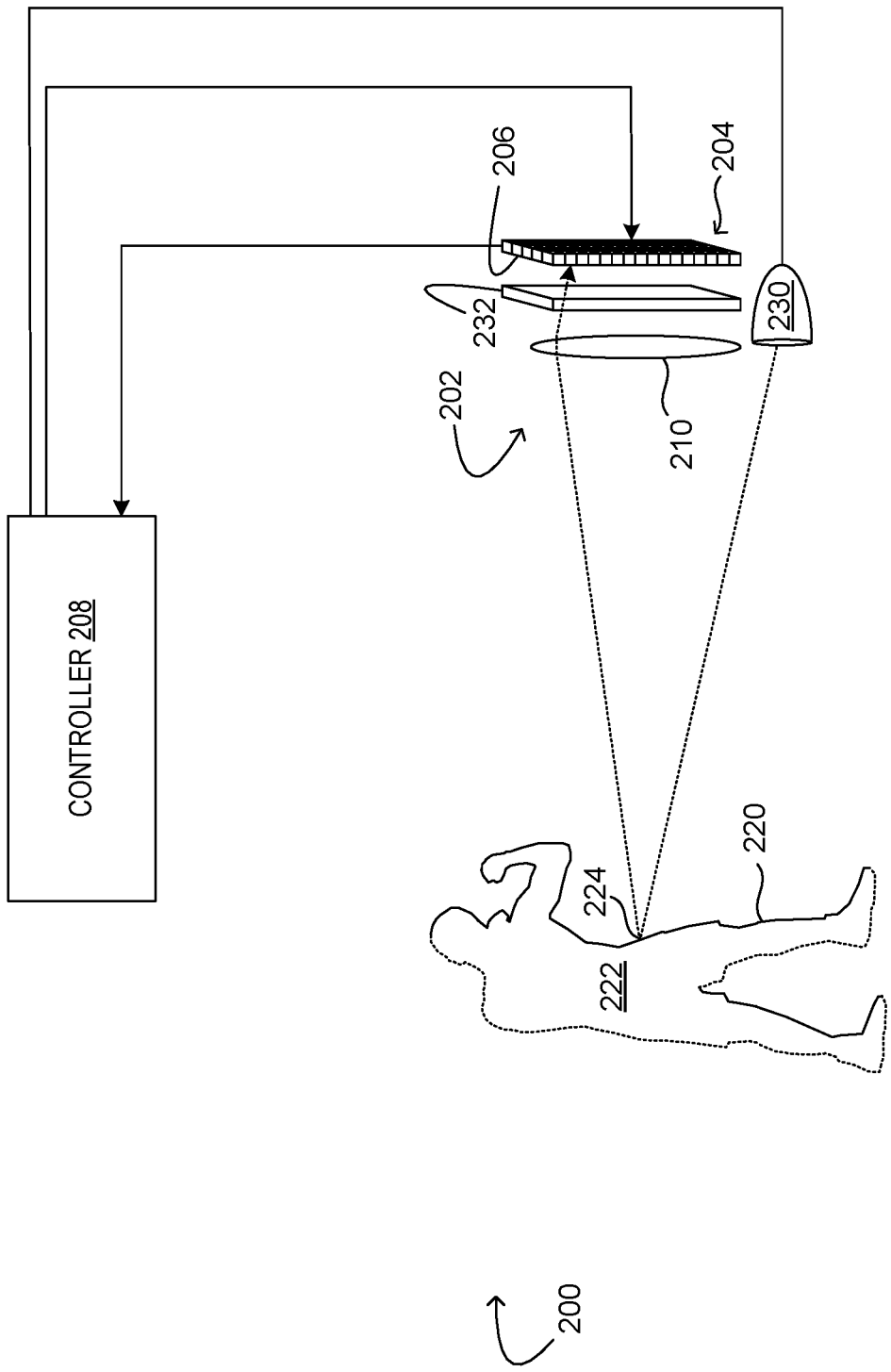
FIG. 2 shows aspects of an example ToF camera system.

FIG. 2 shows a schematic depiction of an example phase-based ToF depth imaging system 200 including a ToF camera 202. ToF camera 202 includes a sensor array 204 comprising a plurality of ToF pixels 206 each configured to acquire light samples that capture phase data, a controller 208, and an objective lens system 210. In some examples, objective lens system 210 may be omitted. Objective lens system 210 is configured to focus an image of at least one surface 220 of a subject 222 onto sensor array 204. Controller 208 is configured to gather and process data from ToF pixels 206 of sensor array 204 and thereby construct a depth image of subject 222 and/or the environment. Controller 208 may comprise executable instructions (e.g. software, firmware and/or hardware) to perform phase unwrapping, as described below. In some examples, controller 208 may be implemented across one or more computing devices. Examples of hardware implementations of controller 208 and other computing devices configured to perform phase unwrapping are described in more detail below with reference to FIG. 17.

Depth imaging system 200 also includes a modulated light emitter 230, and an analog and/or digitally modulated electronic shutter 232 for sensor array 204 to control the integration of light by the sensor array 204. Modulated light emitter 230 and sensor array 204 may be controlled via controller 208. Modulated light emitter 230 may be configured to emit electromagnetic radiation having any frequency detectable by ToF pixels 206. For example, modulated light emitter 230 may include an infrared (IR) light-emitting diode (LED), laser diode (LD), or any other suitable light source. The amplitude modulated light may be modulated at different frequencies sequentially or simultaneously, e.g., the modulation waveform may comprise a manifold of frequencies.

Sensor array 204 is configured to image light from modulated light emitter 230 as reflected off surface 220 and back to the camera. Each ToF pixel 206 of sensor array 204 may comprise one or more pixel taps operable to integrate the reflected light signal at different time intervals, from which the phase shift can be determined. Sensor array 204 is controlled, for each modulation frequency, to sample light at plural phase angles of the amplitude-modulated light from the light source, and determine a phase sample for each modulation frequency from the plurality of light samples for the modulation frequency. The phase samples can then be unwrapped via the examples described herein to obtain a depth value for each pixel.

Figure 3:
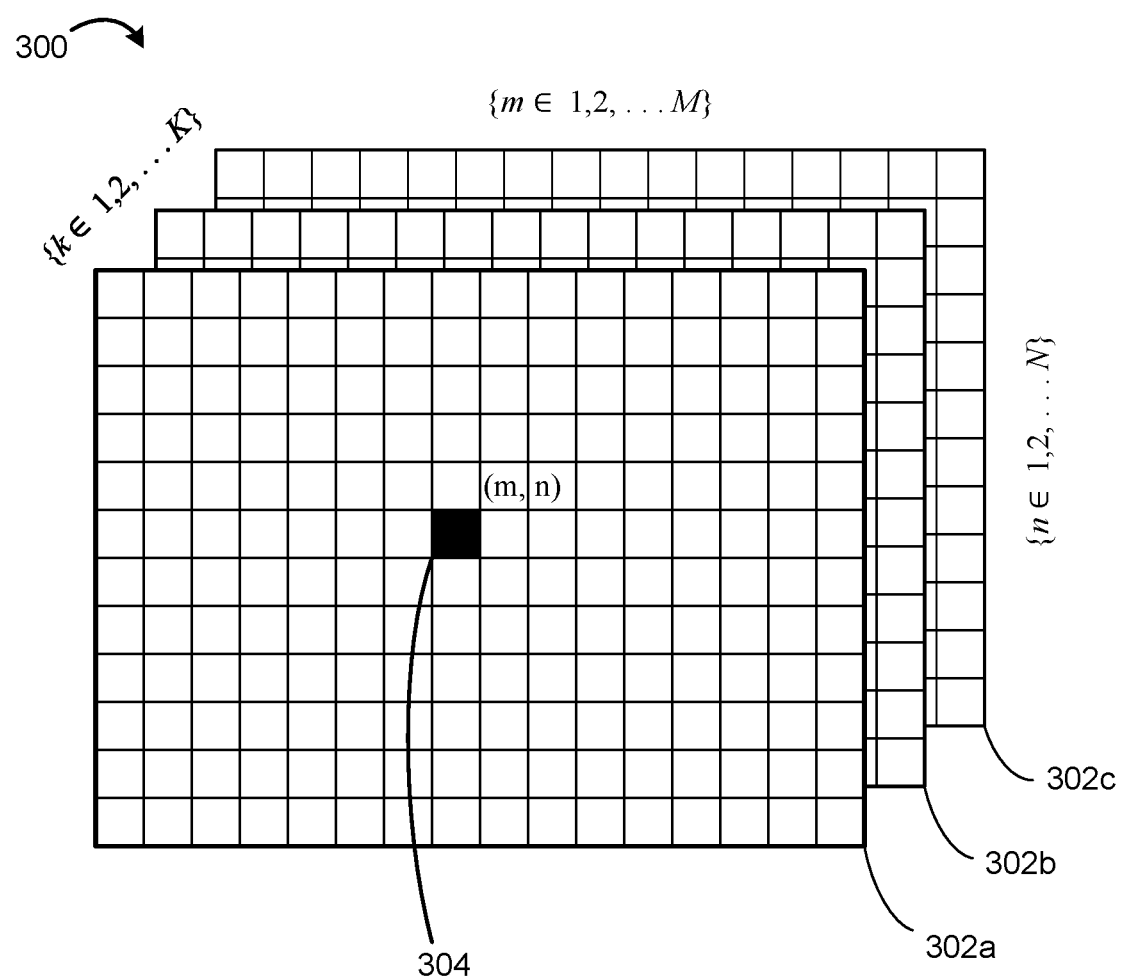
FIG. 3 schematically illustrates example ToF image data for a plurality K of modulation frequencies.

FIG. 3 schematically illustrates example ToF image data 300 for a plurality K of modulation frequencies. Data 300 represents data that can be acquired by depth imaging system 200. In the example shown, the depth data comprises a M×N array of data for each of K modulation frequencies, resulting in M×N grids 302a-c of data, wherein each pixel 304 in each grid represents a measurement acquired at a corresponding illumination light modulation frequency k of K modulation frequencies. For example, the experimental signal $\tilde{S}_k$ collected by pixel 304 at (m,n) is represented by $$\tilde{S}_k(m,n) = \tilde{A}_k(m,n) e^{i\tilde{\phi}_k(m,n)} \qquad \text{Eq. 1}$$

where $\tilde{\phi}_k$ is the phase, $\{m \in 1,2 \ldots, M\}$, $\{n \in 1,2 \ldots, N\}$, and $\{k \in 1,2 \ldots, K\}$. A tilde accent over a variable indicates that the variable has been obtained and/or calculated experimentally, while the absence of a tilde accent indicates variables that correspond to a noise-free situation.

As the disclosed examples operate on a pixel-by-pixel basis, the (m,n) notation will be omitted going forward for simplicity. The terms "distance" and "depth value" may be used interchangeably when referring to the output value of a pixel. While various examples are described in the context of three light modulation frequencies, any number of frequencies K≥2 can be used.

The phase of the complex signal $\tilde{\phi}_k$ may be computed as $$\tilde{\phi}_k = \arctan 2(\tilde{S}_k^i, \tilde{S}_k^r) \qquad \text{Eq. 2}$$

where $\tilde{S}_k^i$ is the imaginary part of the signal collected for frequency k and $\tilde{S}_k^r$ is the real part of the signal collected. The measured phase is used to compute the depth value associated with the pixel. However, as mentioned above, in phase-based ToF imaging, there is a limitation on the distance that can be measured (referred to as the unambiguity range) imposed by the modulation frequency. At the sensor, the relationship between the total phase $\phi$ of the amplitude modulated light and the travelled distance is proportional to the modulation frequency of the light, as given by Equation 3:

$$\phi = \frac{4\pi d f}{c} \qquad \text{Eq. 3}$$

where d is the distance, f is the modulation frequency, and c is the speed of light. As described above, due to the periodic nature of the modulated light, the measured total phase repeats (or wraps) every $2\pi$. For example, given a measured phase $\tilde{\phi}$k, the total phase is $\tilde{\phi}_k + 2\pi n_k$, where $n_k$ is an integer. Since $n_k$ cannot be directly measured via a phase based ToF pixel, the total phase is ambiguous. As the measured phase ranges from 0 to $2\pi$, the range of unambiguity in the determined distance is from 0 to $$\frac{c}{2f}.$$

Distances less than $$\frac{c}{2f}$$

can be determined without ambiguity, whereas distances beyond this range cannot be determined without additional information. As such, higher frequencies will have a shorter range of unambiguity.

Figure 4:
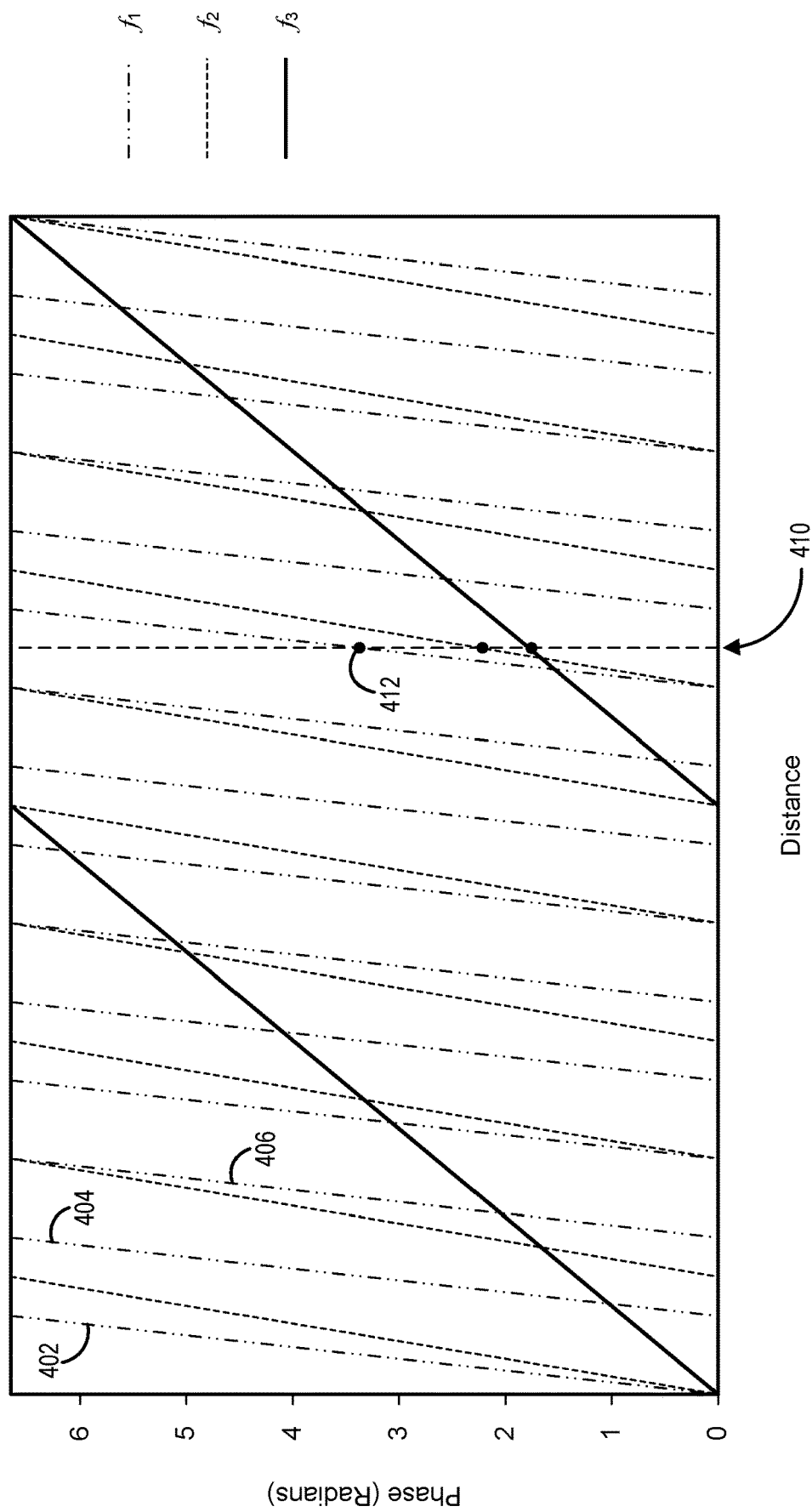
FIG. 4 depicts a linear relationship between phase and distance for an example signal set comprising phase measurements for each of three different modulation frequencies.

FIG. 4 depicts a linear relationship between phase and distance for three frequencies of amplitude modulated light. For a given frequency, when the total phase increases beyond $2\pi$, the measured phase "wraps" around to 0. For a single frequency f the range of unambiguity, $$\frac{c}{2f},$$

is the distance to the first point. The phase order of the total phase is the number of times the phase wraps around. For example, line 402 corresponds to the phase in the zeroth phase order of frequency $f_1$. Likewise, lines 404 and 406 correspond to the first and second phase orders of frequency $f_1$.

The modulation frequency of the illumination light imposes a linear variation in precision of a phase measurement. Linear variations on the estimation of the phase lead to variations in the depth value depending on frequency. Rearranging Eq. 3 above to solve for distance results in:

$$\vec{d} \sim \tilde{d}_k = \frac{c(\tilde{\phi}_k + 2\pi n_k)}{4\pi f_k} \qquad \text{Eq. 4}$$

where $\tilde{\phi}_k$ is the measured noisy phase of modulation frequency $f_k$ and $n_k$ is the phase order. Here, $\vec{d}$ is the distance in the ideal noise-free case and/or represents a most likely distance, which may be a weighted average of two or more noisy a values, as described below. As seen in Eq. 4, the error in distance a depends on the error of the measured phase $\tilde{\phi}$k, and is inversely proportional to the frequency. As such, higher frequencies typically correspond to smaller errors. This can be seen in FIG. 4, as an error in the phase corresponds to a relatively smaller error in distance when the slope is relatively steep (e.g., $f_1$ in FIG. 4). Thus, while higher frequencies reduce the range of unambiguity compared to lower frequencies (e.g., $f_3$ in FIG. 4), higher frequencies are also associated with greater errors in the depth value.

Accordingly, a set of K≥2 modulation frequencies k can be used to increase the range of unambiguity, allowing the phase information to be unwrapped for the accurate determination of distance. Phase unwrapping, which can also be referred to as 'de-aliasing,' is a way to disambiguate the phase shift data and identify a correct distance value by illuminating the scene with amplitude-modulated light of a plurality of different frequencies, as the distance ambiguities are different for each frequency of illumination light. For example, in a multifrequency method, the amplitude modulated light may comprise a waveform comprising a plurality of frequencies $\vec{f} = \{f_1, f_2, \ldots, f_K\}$. The collection of frequencies comprises frequencies that are chosen to wrap at different locations in the unambiguity range (see FIG. 4), which extends from distance zero in FIG. 4 to the point at the far-right side of the depicted graph, where all three frequencies wrap at a common location.

In the absence of noise, the determined distance ideally would same for each frequency $f_k$ (see Eq. 4). For example, in the example scenario in FIG. 4, the distance 410 intersects (at intersection point 412) with the tenth line segment, or ninth wrapping, of frequency $f_1$. Thus, the phase order for this frequency is $n_1$=9. Similarly, $n_2$=6, $n_3$=1, and the phase order set corresponding to distance 410 is $\vec{n}$={9,6,1}. However, as discussed above, the precision varies due to noise. Accordingly, the disclosed examples find a determined most likely phase order set for noisy phase measurements. Referring again to FIG. 4, the phases of each light modulation frequency evolve linearly with distance, with a slope of each line being proportional to the corresponding frequency. As such, in a first example implementation, the evolution of phase is represented as a straight line in K-dimensional space:

$$R = \vec{\phi}_0 + t\hat{f} \qquad \text{Eq. 5}$$

where t is a parameter corresponding to the distance, $\hat{f}$ is the slope, $\vec{\phi}_0$ is the initial phase, and $\vec{r}_0$ is the starting point. The line of Eq. 5 is a phase evolution line corresponding to the ideal phase in the absence of noise. Equation 3 suggests the phase begins at 0. With this assumption, $\vec{\phi}_0 = \vec{0}$ and the equation is simplified to:

$$R = t\hat{f} \qquad \text{Eq. 6}$$

where R is the line and t is the distance parameter.

In an ideal error-free scenario, the depicted combination of three measured phases will correspond to a unique depth value within the unambiguity range. However, due to noise, the phase number $n_k$ (the number of the phase wrapping) for a measurement made at a modulation frequency k may be uncertain. As described in more detail below, an unwrapping process to obtain the most likely phase order set ($\vec{n}=\{n_1, n_2, \ldots, n_K\}$) can be based on comparing a projected noisy phase point to a predetermined matrix of points in a lower dimensional projection plane. The noisy phase point in K-dimensional phase space is projected along a direction parallel to a reference phase vector, which is a line that represents the evolution of phase with distance. In one example, a noisy phase point is projected to a plane normal to the reference phase vector. In another example, the noisy phase point is projected onto a zero plane (e.g. a cartesian plane with one coordinate set at a zero value) in the K-dimensional space. The most likely phase order set is determined by comparing the projected noisy phase point to independent terms plotted through the matrix of points, and selecting the most likely phase order set by using the independent terms to reference a look-up table.

Figure 5:
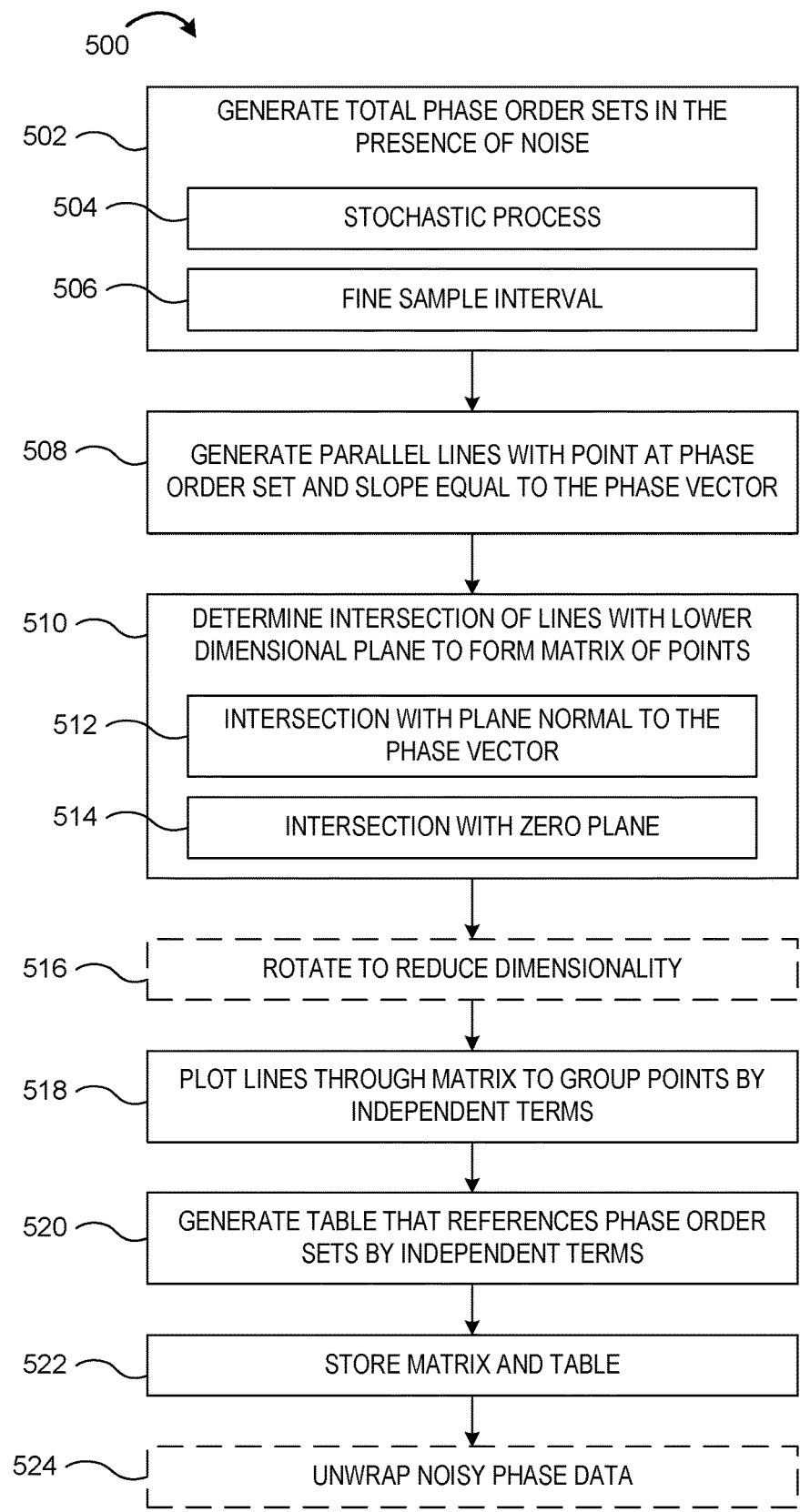
FIG. 5 is a flow diagram illustrating an example method for generating a matrix and look-up table for performing phase unwrapping.

FIG. 5 is a flow diagram illustrating an example method 500 for generating a matrix of points and associated look-up table for performing phase unwrapping. The various steps outlined in method 500 are discussed in more detail below with respect to FIGS. 6-12. The examples are depicted in three-dimensional phase space in the context of three light modulation frequencies. However, the method described herein can be applied to any suitable number of modulation frequencies.

Method 500 comprises, at 502, generating total phase order sets representative of phase order sets likely to be produced in the presence of noise. Each phase order set comprises K total phases corresponding to K frequencies of amplitude modulated light. In some examples, at 504, a stochastic process is used to generate the points from the reference phase vector. In other examples, an analytical method or error propagation method may be used. In examples where the probability of noise is known, the total phase order sets may be calculated based on the probabilities. In some examples, at 506, the reference phase vector is fine sampled by generating noisy phase points from points along the reference phase vector, as described in more detail below. Method 500 further comprises, at 508, generating a set of parallel lines in K-dimensional space that run through points associated with the total phase order sets generated at 502.

At 510, method 500 comprises locating the intersection of the parallel lines with a lower dimensional plane to form a matrix of points. In some examples, at 512, the lower dimensional plane is normal to the reference phase vector. In other examples, at 514, the lower dimensional plane is a zero plane. Where the lower dimensional plane is normal to the reference phase vectors, at 516, a rotation can be performed on the matrix of points to reduce dimensionality. Additionally or alternatively, a change of coordinate system may be applied to reduce dimensionality.

Method 500 further comprises, at 518, plotting lines through the matrix of points to group points. A group of points comprises one or more points lying on or near a line of a set of parallel lines. As discussed in more detail below, each set of parallel lines in the lower dimensional plane corresponds to a different independent term. Each independent term references a line—and corresponding group of points—within the set of parallel lines. Each point lies at an intersection of lines and each point is thus referenced by the independent terms. As each point is associated with a phase order set, at 520, method 500 comprises generating a table that references phase order sets by independent terms, and at 522, storing the matrix of points and look-up table, which can then be utilized for unwrapping noisy phase data at 524.

As discussed above, a stochastic process may be used to calculate phase order sets that are most likely to be produced by the data $\vec{N}=\{\vec{n}^1, \vec{n}^2, \ldots \vec{n}^L\}$. In one example employing a stochastic method, a range of interest is fine sampled as described below, and the phase vectors ($\vec{\phi}(d)$) are provided via Eq. 3. The range of interest can comprise any subset up to and including the full range of unambiguity. Once the reference phase vector $\vec{\phi}(d)$ are generated, random noise, compatible with noise generated by the image sensor, is added to generate a noisy phase vector $\vec{\phi}(d)$. The noise generated may comprise anisotropic noise (variance dependent of frequency) or isotropic noise (variance independent of frequency). The phase order vectors $\vec{n}^l$ are calculated as a floor:

$$\vec{n}^l = \text{floor}\left[\frac{\vec{\phi}(d)}{2\pi}\right] \qquad \text{Eq. 7}$$

where the floor function outputs the greatest integer less than or equal to a value. The procedure may be repeated a suitable number of times to check possible combinations of phase orders. Unique phase orders may be selected for the phase order sets N.

Figure 6:
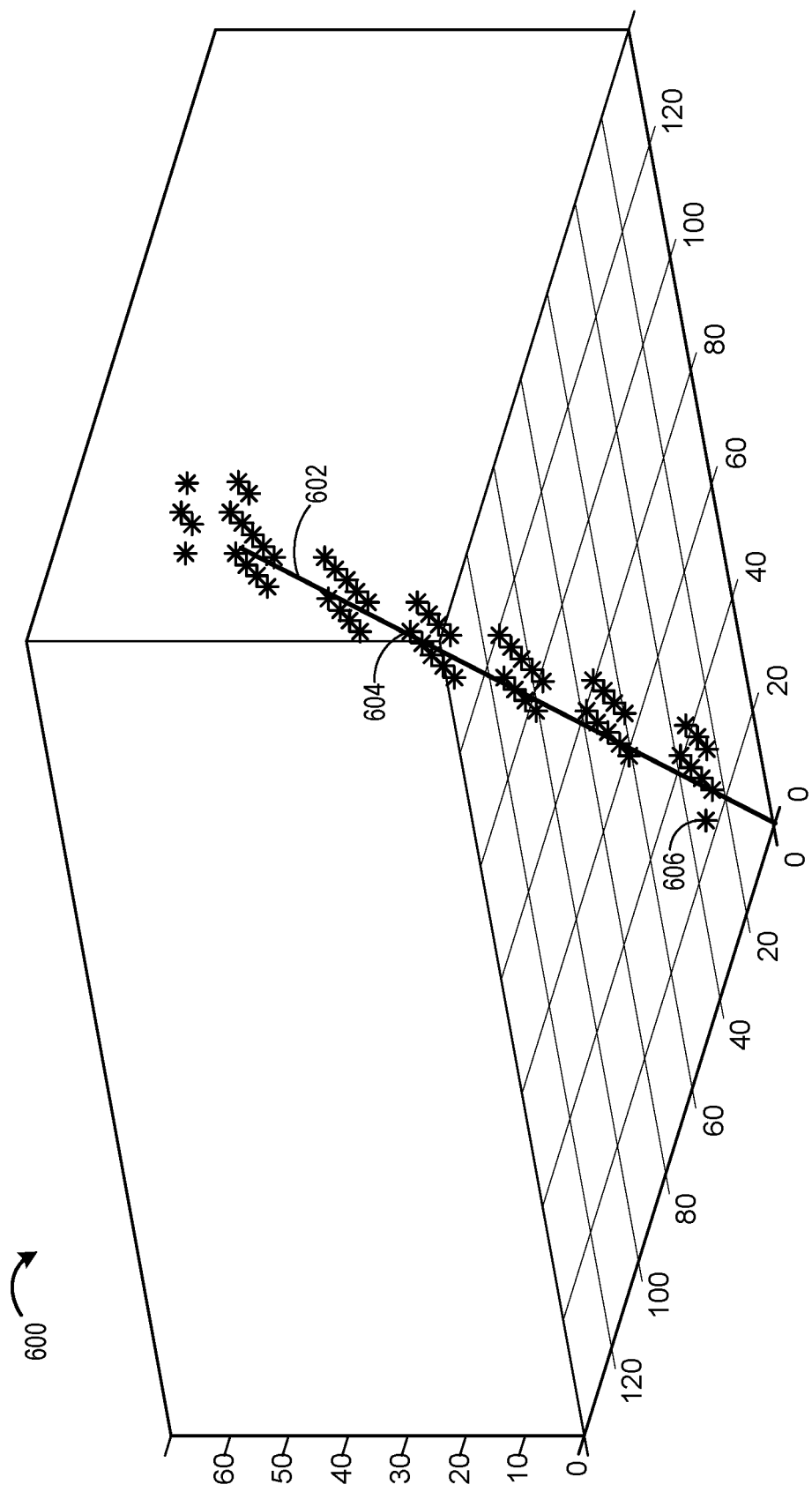
FIG. 6 shows a graph of an example reference phase vector depicting the evolution of phase with distance for a set of ToF phase measurements at three different modulation frequencies, and an example series of total phase triplets representing possible unwrapping solutions obtained using a stochastic process.

FIG. 6 shows a graph 600 in 3-dimensional space for a phase evolution line according to Eq. 6 and an example series of 59 total phase triplets resulting from such a stochastic method. In this example, line 602 has slope corresponding to three modulation frequencies: 54, 189, and 198 MHz. Other examples may use different frequencies and/or a different number of frequencies (e.g., K-dimensional space, K>3). The total phase for each modulation frequency is represented on the x, y, and z axes while the length of the line (from the origin) corresponds to the distance parameter (see Eq. 6).

As mentioned above, the series of total phase triplets in FIG. 6 are generated by fine sampling the reference phase vector. In some examples, the sampling resolution is less than the theoretical resolution provided by the frequency set. For example, let frequency vector $\vec{f}=\{198, 189, 54\}$ MHz, as illustrated in FIG. 6, and collected phase vector $\vec{\phi}=\{0.0538, 0.1834, -0.2259\}$. The collected phase vector can be decomposed for the range of unambiguity as $\vec{f}=a\vec{m}$, where a is the greatest common divisor (gcd) of the frequency vector, and also the beat frequency that determines the range of unambiguity. Further, $\vec{m}$ is the coprime frequency vector. In this example, a=9 and $\vec{m}=\{22, 21, 6\}$. In the example depicted in FIG. 6, the unambiguity range was sampled every 1 mm, and Gaussian isotropic noise was added with variance 0.01 rad$^2$. Within each distance interval, 10,000 noisy phase vectors were generated, from which phase order vectors were calculated, resulting in 59 vectors $\vec{N}=\{\vec{n}^1, \vec{n}^2, \ldots \vec{n}^{59}\}$. Other examples may generate phase vector sets using different values.

Figure 7:
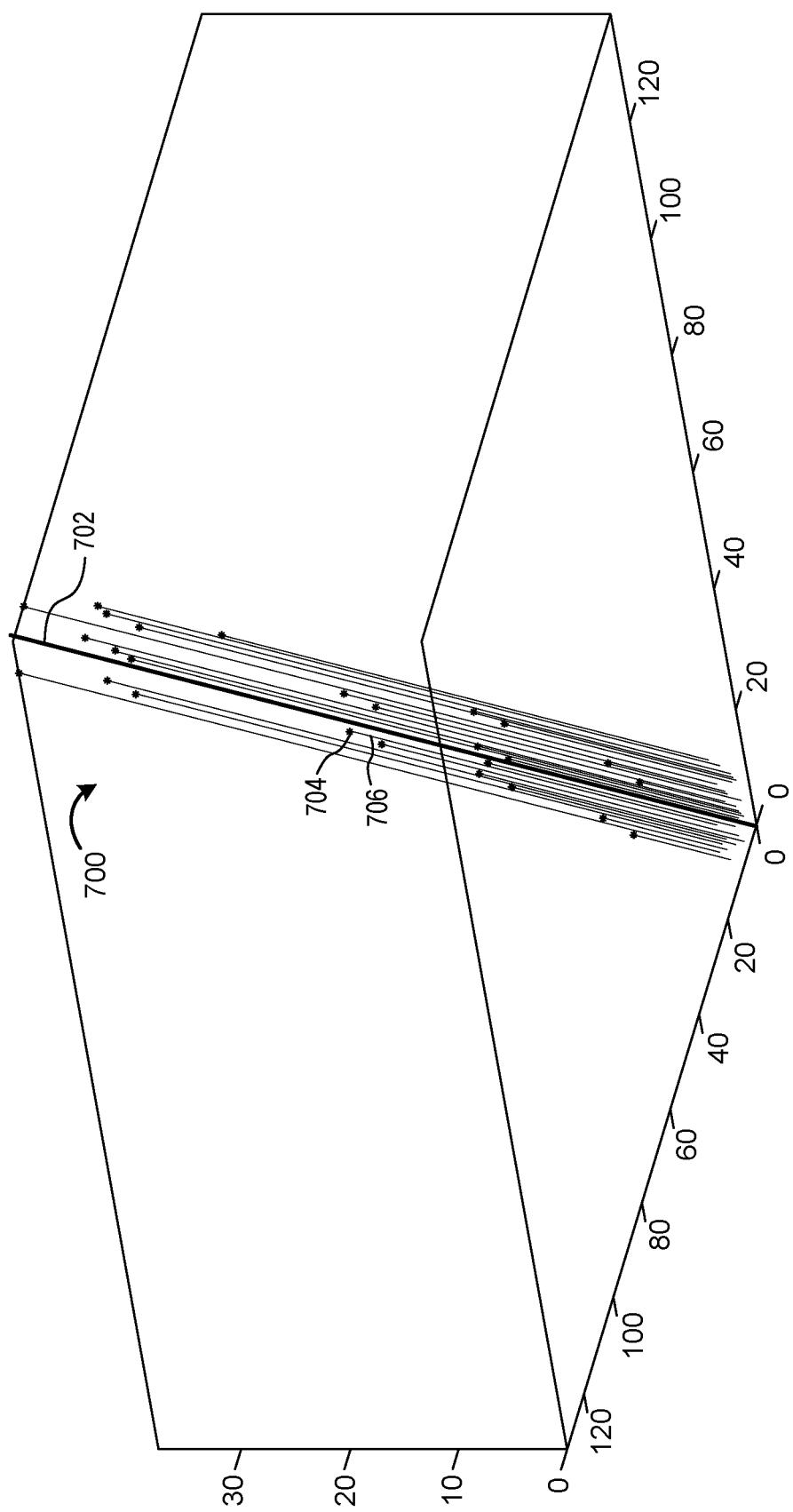
FIG. 7 shows an example set of parallel lines each having a point corresponding to a different total phase triplet obtained by a stochastic process, and slope parallel to a reference phase vector.

Next, a number of parallel lines are generated using, for each line, a set of noisy phase orders as the points and the phase evolution line as slope. The set of L parallel lines $\vec{R}^L$ is described as:

$$\vec{R}^L = \vec{r}^L = \vec{n}^L + t^L \hat{f} \qquad \text{Eq. 8}$$

where $\vec{r}^L$ is a line corresponding to point $\vec{n}^L$, $t^L$ is a distance parameter, and f is the frequency vector. FIG. 7 depicts an example series of parallel lines 700 that are parallel to phase evolution line 702. The parallel lines correspond to a subset of the total phase triplets depicted in FIG. 6, as some points and lines are omitted for clarity. For example, point 704 is used to generate line 706 which is parallel to phase evolution line 702. In the 3-dimensional example depicted in FIG. 7, $\vec{r}^L = \{r_1, r_2, r_3\}$.

The total phase points are projected onto a lower dimensional plane (e.g., a hyperplane) by extending the parallel lines to intersect the lower dimensional plane thereby obtaining a matrix of points. Each point in the matrix of points corresponds to an intersection of a line with the lower dimensional plane. Further, each point of the matrix represents a phase order set (i.e., the phase order set associated with the line). Any suitable lower dimensional plane may be used for projecting points. In some examples, a plane normal to the phase vector is used (e.g., FIG. 8). In such examples, the plane may then be rotated to reduce the dimensionality of the plane. In other examples, a coordinate plane or zero plane is used (e.g., FIG. 11). If the set of parallel lines $\vec{R}^L$ is projected onto a plane perpendicular to the phase evolution line R the resulting matrix of points may comprise a lattice wherein the spacing of points is dependent on the frequencies.

In some examples, the normal plane P may be chosen to go through the origin, which may simplify calculations. With this choice, normal plane P is defined as:

$$P = \hat{f} \vec{r} = 0 \qquad \text{Eq. 9}$$

with $\vec{r}^L = \{r_1, r_2, r_3\}$ and where $\hat{f}$ is the phase vector. The distance to propagate a line $\vec{R}^l$ with $l \in \{1, 2, \ldots, L\}$ to the plane P is calculated as the intersection of a line $\vec{R}^l$ and the plane P. In 3-dimensional space this produces a determined system with 3 equations and 3 variables. The solution can be solved in vector form:

$$t^l = -\vec{n}^l \hat{f} \qquad \text{Eq. 10}$$

where $t^l$ is the distance in phase space between phase point $\vec{n}^l$ and the projection plane along line $\vec{R}^l$, and $\hat{f}$ is the transpose of the reference phase vector. The projected points onto the plane P are calculated as:

$$\vec{r}_P{}^l = \vec{n}^l + t^l \hat{f} \qquad \text{Eq. 11}$$

where $\vec{r}_P{}^l$ is the location of the projected point in phase space.

Figure 8:
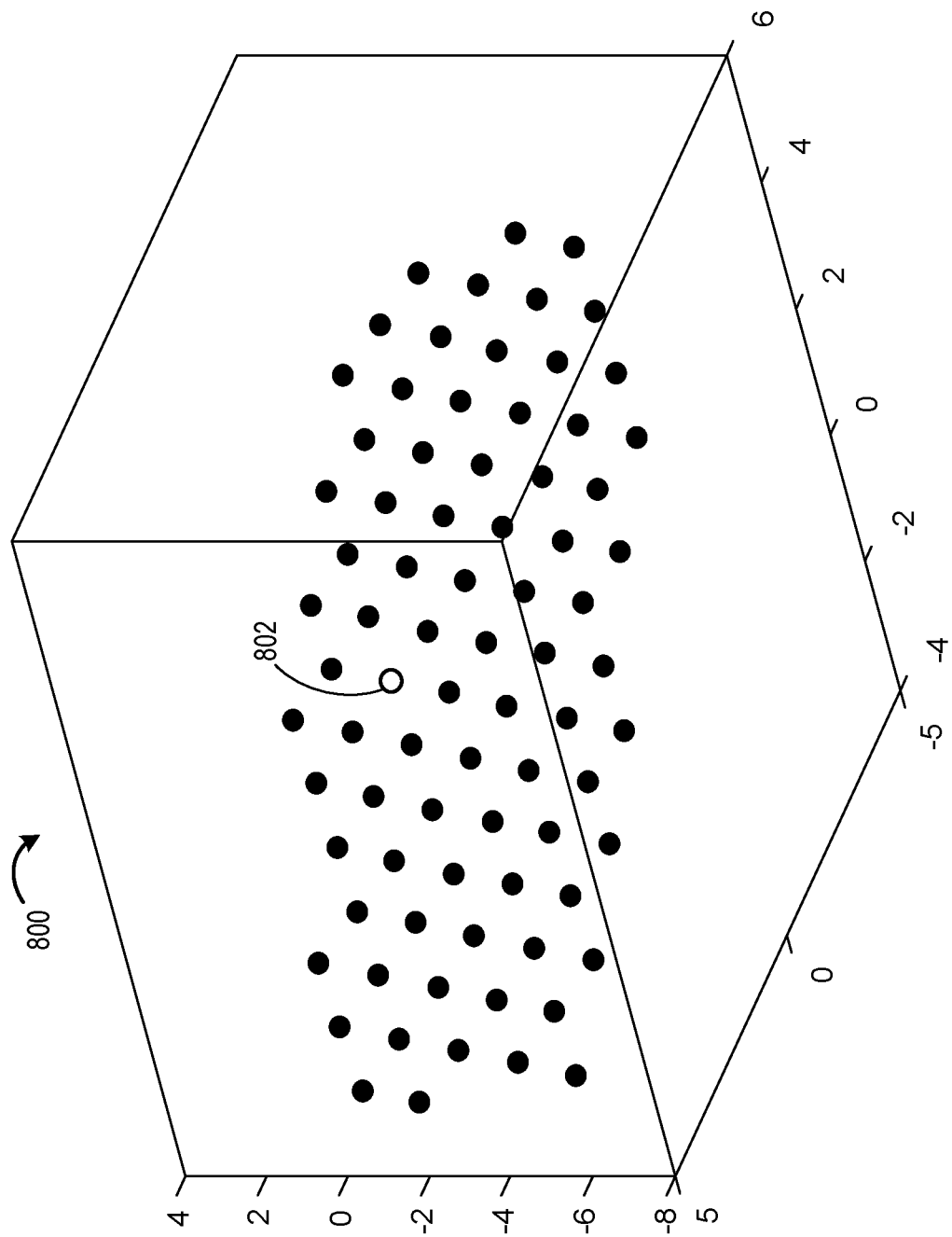
FIG. 8 shows an example matrix of points representing intersections of a set of parallel lines with a plane normal to the reference phase vector.

FIG. 8 shows an example where total phase triplets have been projected along lines parallel to the reference phase vector to intersect a plane normal to the reference phase vector. The intersection locations between the parallel lines and the normal plane give a matrix of points 800. In this example, the matrix of points lies in a 2-dimensional plane in 3-dimensional space. Origin point 802 corresponds to the projection of the noiseless phase evolution line. In this example, the normal plane goes through origin point 802. The location of the points can be computed using Eq. 11 above, for example.

Figure 9:
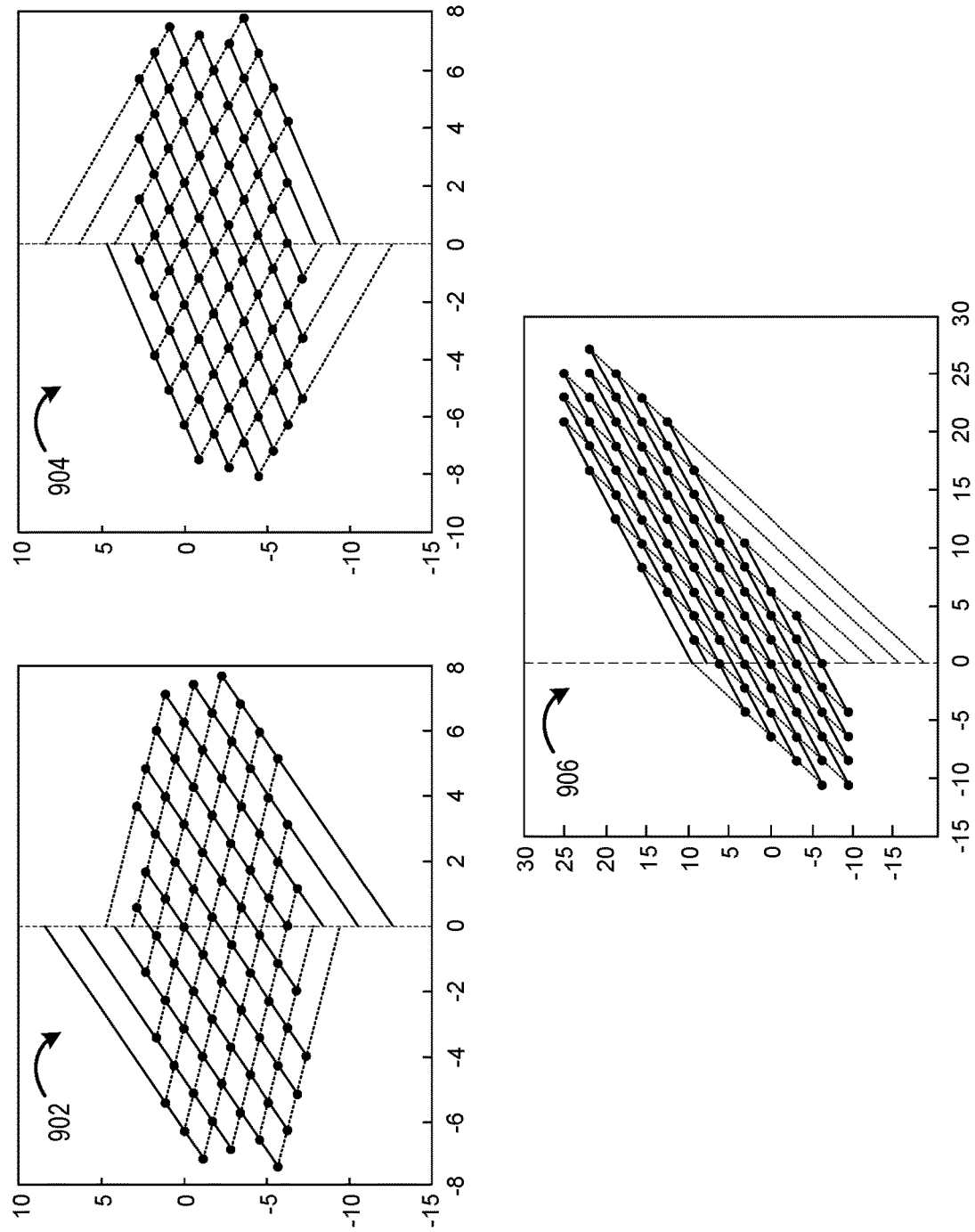
FIG. 9 shows three example matrices of points from projecting the parallel lines of FIG. 7 respectively onto the Y-Z, X-Z, and X-Y zero planes.

In some examples, the set of parallel lines are projected onto a zero plane, which is a lower dimensional plane with a zero value for one axis. For example, in 3-dimensional phase space the zero plane may be a coordinate plane such as the X-Y Cartesian plane, the X-Z Cartesian plane, or the Y-Z Cartesian plane. FIG. 9 shows three graphs 902, 904, 906 depicting projections onto zero planes. Graph 902 shows a matrix of points resulting from projecting a set of parallel lines onto the Y-Z Cartesian plane (i.e., zero plane setting X=0). Similarly, graph 904 shows a matrix of points after projecting onto the X-Z Cartesian plane (i.e., Y=0) and graph 906 shows a matrix of points after projecting onto the X-Y Cartesian plane (i.e., Z=0).

The zero plane may be defined as $$P_o = r_o = 0 \text{ with } o = \{1, 2, 3\} \qquad \text{Eq. 12}$$

where $r_o = 0$ indicates which coordinate is set to zero. For example, graph 902 corresponds to $r_1 = 0$. The distance to propagate a line $\vec{R}^l$ with $l \in \{1, 2, \ldots, L\}$ to the plane P is calculated as the intersection of a line R and one of the planes $P_o$ (composed by 2 perpendicular lines). Since the 3-dimensional case produces a determined system with 3 equations and 3 variables, the solution can be solved in vector form as:

$$t_o{}^l = -n_o{}^l f_o \qquad \text{Eq. 13}$$

where $t_o{}^l$ is the propagation distance along line l in dimension o. Therefore, the projected points onto the plane $P_o$ are determined as:

$$\vec{\rho}_P{}^l = \vec{n}^l + t_o{}^l \hat{f} \qquad \text{Eq. 14}$$

where $\vec{\rho}_P{}^l$ is the location of the projected total phase point in zero plane $P_o$.

As mentioned above, in some examples, the matrix of points may be rotated to reduce dimensionality. Additionally or alternatively, dimensionality reduction may comprise a change in the coordinate system. For example, as the matrix of points 800 comprises 3-dimensional points in a tilted 2-dimensional plane, a rotation may be applied to reduce the points to 2-dimensional points. As such, dimensionality reduction may be achieved by multiplying the coordinates $\vec{r}_P{}^l$ by the 3-dimensional rotation matrix composed by the coordinate system given by the normalized frequency vector $\hat{f}$ and two perpendicular vectors. The perpendicular vectors are calculated by the vector product: $\vec{f}_1 = \hat{f} \times \hat{r}_i$, $\hat{r}_k$ being a unitary vector, $k \in \{1, 2, 3\}$, and $\vec{f}_2 = \hat{f} \times \vec{f}_1$. The rotation matrix can be expressed as $Rot = [\hat{f}, \hat{f}_1, \hat{f}_2]$ sorted either way in columns or vectors. Given this rotation matrix, the rotated points are then solved:

$$\vec{\rho}_P{}^l = \vec{r}_P{}^l Rot \qquad \text{Eq. 15}$$

where $\vec{\rho}_p{}^l$ is the location of the intersection point after rotation. As a result of the rotation, the dimension corresponding to the unitary vector $\hat{r}_k$ of the rotated projected point $\vec{\rho}_P{}^l$ is 0.

Figure 10:
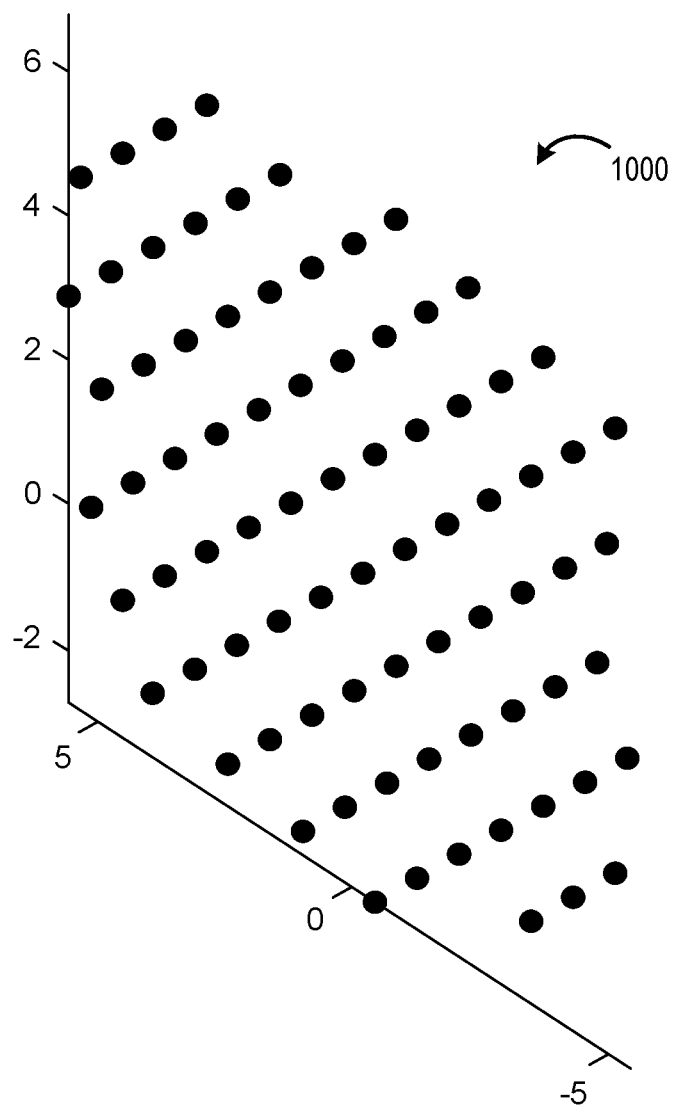
FIG. 10 shows the matrix of points of FIG. 8 after dimensionality reduction by a change of coordinate system.

FIG. 10 shows a 2-dimensional matrix of points 1000 resulting from applying a rotation to matrix of points 800. Here, the dimension corresponding to the unitary vector is dropped after rotation to reduce the points to 2-dimensional points. In other examples, such as those shown in FIG. 9, a rotation matrix may be omitted.

After obtaining the matrix of points, the points are grouped by plotting independent terms through the matrix.

Figure 11:
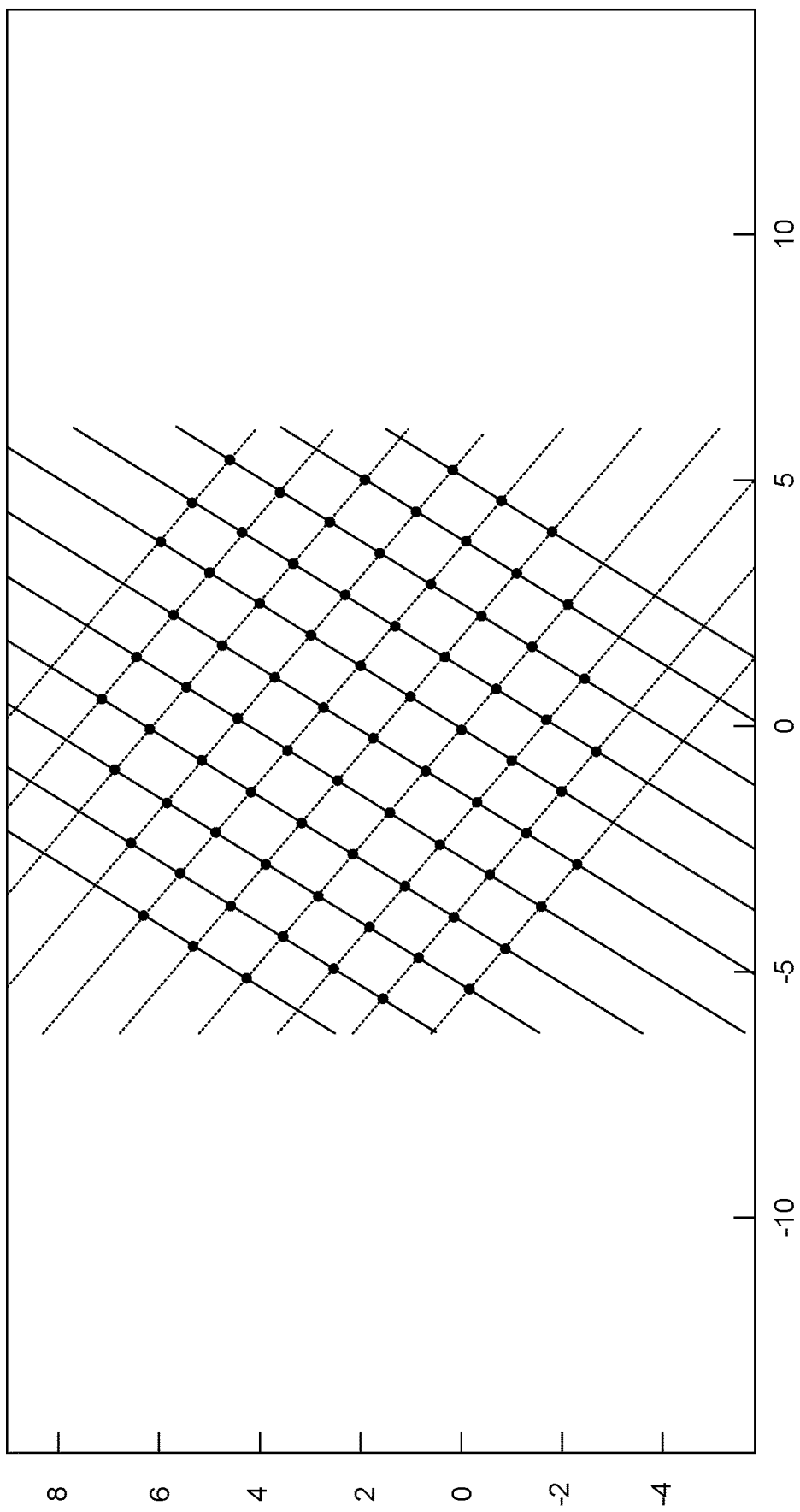
FIG. 11 shows two sets of parallel lines intersecting the matrix of points of FIG. 10, each set of lines providing an independent term for the phase order.

As described above, each independent term references groups of projected phase order points along parallel lines in the lower dimensional plane. As shown in FIG. 10, the projected phase order points are distributed in privileged directions, e.g., aligned with the lattice vectors forming the lattice of points. As such, two or more sets of parallel lines can be drawn through the matrix to group the points, as depicted in FIG. 11. The 10 dotted lines shown in FIG. 11 correspond to a first independent term and the 11 solid lines correspond to a second independent term. In the example shown in FIG. 11, the independent terms are not unique since they are determined by the orientation of the lattice. However, since the points lie at intersections, every point may be referenced by a unique combination of independent terms.

The slope of the parallel lines plotted through the matrix of points may be obtained in any suitable method. For example, a stochastic method may be used to find the most frequent slopes among the projected points. Given two points within the matrix of points, the slope is a ratio between the vertical and horizontal displacements. Likewise, for the set of points $\rho_p^l$, the slope is $$\alpha^l = \frac{\rho_P^l(2) - \rho_P^l(2)^t}{\rho_P^l(1) - \rho_P^l(1)^t} \quad \text{Eq. 16}$$

where $\alpha^l$ is the slope, $\rho_P^l(2)$ is the coordinate in the first direction (e.g., vertical), $\rho_P^l(1)$ is the coordinate in the second direction (e.g., horizontal), and t indicates the matrix transpose. The resultant $\alpha^l$ is a symmetric matrix in which the diagonal elements are infinite, as the divisor for these elements is zero. Applying an arctan operation creates a symmetric matrix which has diagonal elements of $$\frac{\pi}{2},$$

$$\theta^l = \arctan(\alpha^l) \quad \text{Eq. 17}$$

where $\theta^l$ is the set of angles. Then, the two most frequent angles are found from the mode of the off-diagonal elements, e.g., the upper triangular matrix. In some examples, the angles may be rounded to make the process less sensitive to computational precision. In other examples, any other suitable method may be used to obtain the two most frequent angles (e.g., binning). Further, the most frequent slopes may be obtained from the angles by applying a tangent operation. Once the most frequent slopes $\alpha_k^l$ with $k \in \{1,2\}$ are found, the independent terms are calculated as $$\beta_k^l = \alpha_k^l \cdot \rho_{P'}(1) - \rho_{P'}(2) \quad \text{Eq. 18}$$

where $\beta_k^l$ are the independent terms.

For example, the lines of FIG. 11 may be determined by finding the two most common slopes in matrix of points 1000, and then plotting lines through the points. In examples where the total phase points are projected onto a zero plane, the lines may be plotted through the matrix of points in the zero plane without rotation. Graph 902 shows lines corresponding to the two most common slopes plotted through the matrix of points within the Y-Z Cartesian plane. Likewise, graphs 904 and 906 show lines drawn through a matrix of points in the X-Z Cartesian plane and X-Y Cartesian plane, respectively.

Assuming that $\vec{\beta}_k$ represents the set of unique independent terms for direction k with $\vec{\beta}_1 = \{\beta_1^1, \beta_1^2 \ldots, \beta_1^I\}$ and $\{\beta_2^1, \beta_2^2, \ldots, \beta_2^J\}$, the independent terms are sorted ascendingly which makes a table of I rows and J columns. In addition, as the slopes are parallel, the distance between independent terms is the same and there are two differences between consecutive independent terms $\Delta_k = |\beta_k^1 - \beta_k^2|$. Next, the terms are used to produce a matrix with dimensions (I,J) as:

$$\begin{cases} \dfrac{\vec{\beta}_1 - \beta_1^1}{\Delta_1} + 1 = i & \text{with } i \in \{1, 2, \ldots, I\} \\ \dfrac{\vec{\beta}_2 - \beta_2^1}{\Delta_2} + 1 = j & \text{with } j \in \{1, 2, \ldots, J\} \end{cases} \quad \text{Eq. 19}$$

where $\Delta_1$ is the difference between consecutive independent terms for $\vec{\beta}_1$ and $\Delta_2$ is the difference between consecutive independent terms for $\vec{\beta}_2$. The result of this operation are elements of a matrix that are related to the phase order.

FIG. 12 shows an example look-up table 1200 produced from the matrix of points and independent terms of FIG. 11. Each non-zero element of look-up table 1200 references a different phase order set. The location of a phase order set L can be determined using Eq. 19. In the example shown, the phase order sets are numbered. Here, the number indexes a phase order set L within the set $\vec{N} = \{\vec{n}^1, \vec{n}^2, \ldots \vec{n}^L\}$ obtained as described above. In other examples, the table elements each may comprise a phase order set rather than an index number. The 0 elements in look-up table 1200 correspond to location in the lower dimensional plane without a projected phase order (those produced by the stochastic process that were not feasible).

The lines corresponding to the independent terms intersect at a point in FIG. 11 corresponding to the projected location of the phase order set referenced by the table element. For example, if the first independent term is 3 and the second independent term is 4, the table element references phase order set 48, as in this example, first independent term line 3 and second independent term line 4 intersect at phase order set 48. Next, the actual phase order set is looked up using index 48, e.g., by retrieving $\vec{n}^{48}$ from the series $\vec{N} = \{\vec{n}^1, \vec{n}^2, \ldots \vec{n}^L\}$. The dimensions of look-up table 1200 correspond to the number of unique independent terms found using Eq. 18. In other examples, the look-up table may have a different size and may have a different number of non-zero elements.

Once the phase order set $\vec{N}$, the matrix of points, and the look-up table are calculated, they may be stored and used in phase unwrapping. In some examples, the rotation matrix Rot, the line slopes $\alpha_k$, the independent terms $\vec{\beta}_k$, and/or the distance between lines may also be stored.

Figure 13:
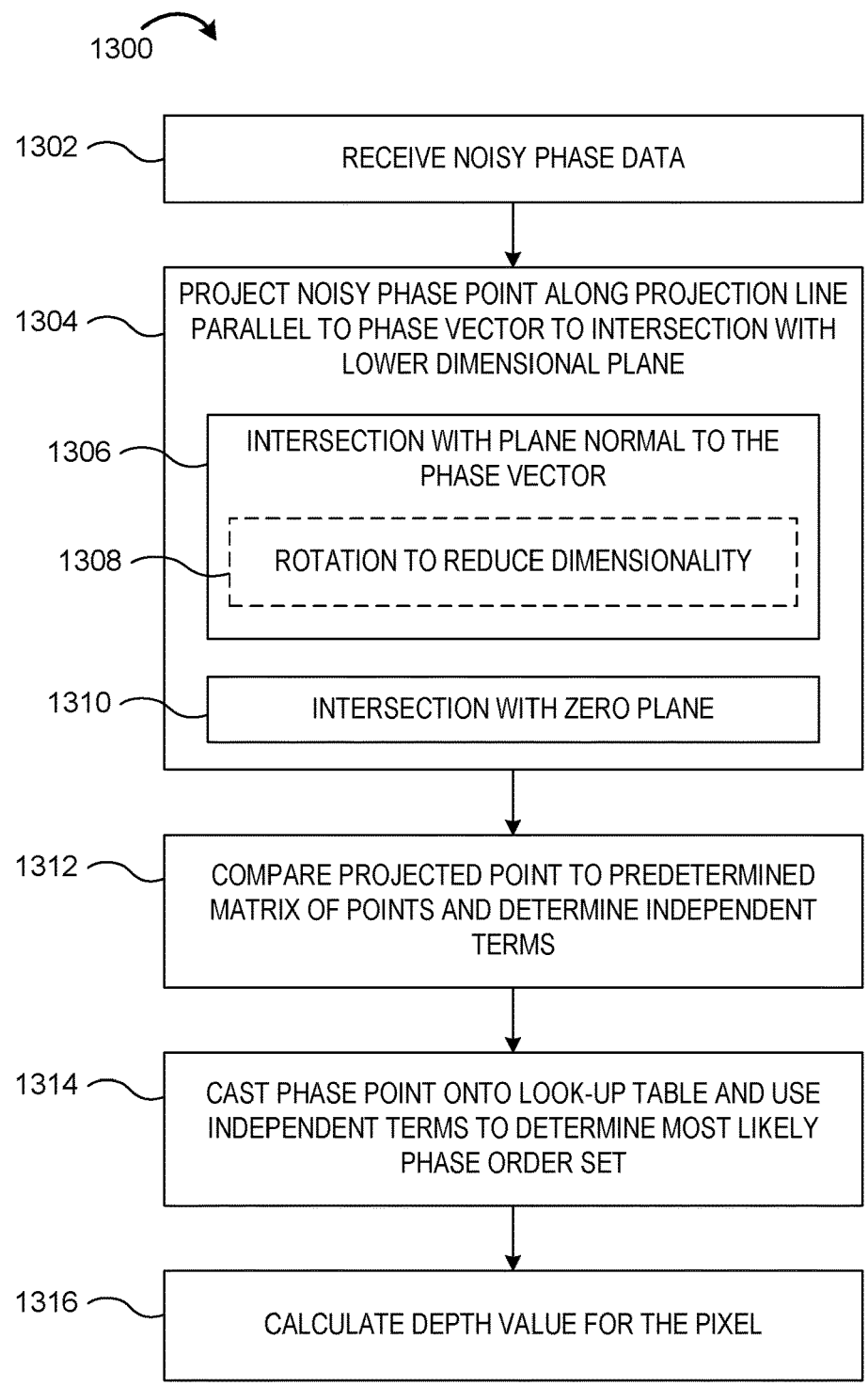
FIG. 13 is a flow diagram depicting an example method for performing experimental noisy phase unwrapping utilizing a matrix or tensor comprising phase order elements.

FIG. 13 is a flow diagram showing an example method 1300 for using a matrix of points and look-up table to determine a most likely phase order set and depth value for a noisy phase point. At 1302, the method comprises receiving noisy phase data comprising K noisy phase measurements. As discussed above, the K noisy phase measurements may be represented by a noisy phase point in K-dimensional space. At 1304, the method comprises projecting the noisy phase point in K-dimensional space along a projection line parallel to a reference phase vector to intersect at a location with a lower dimensional plane.

In some examples, at 1306, the lower dimensional plane is normal to the reference phase vector. For example, the distance of the noisy phase point to the lower dimensional plane P can be calculated as $$\tilde{t} = -\vec{\tilde{\varphi}} \cdot \hat{f}^t \qquad \text{Eq. 20}$$

where $\tilde{t}$ is the distance, $\vec{\tilde{\varphi}}$ is the noisy phase vector of the noisy phase point, and $\hat{f}^t$ is the transpose of the reference phase vector. Here, the tilde accent indicates a noisy measurement. In the case of a M×N array of pixels, the distance of a noisy phase point of the image array $\vec{\tilde{\varphi}}(m,n)$, can be calculated as $$\tilde{t}(m,n) = -\vec{\tilde{\varphi}}(m,n) \cdot \hat{f}^t \qquad \text{Eq. 21}$$

where $\tilde{t}(m,n)$ represents the distance of the noisy phase point at pixel (m,n) of the image array. As such, the location of the projected noisy point is calculated as $$\vec{\tilde{\varphi}}_P(m,n) = \vec{\tilde{\varphi}}(m,n) + \tilde{t}(m,n)\hat{f} \qquad \text{Eq. 22}$$

where $\vec{\tilde{\varphi}}_P(m,n)$ is the location within the lower dimensional plane P.

In such examples, the method may further comprise applying a rotation to the projected point to reduce dimensionality. In such examples, the rotation applied is that applied during generation of the matrix of points. For example, dimensionality may be reduced by using a rotation matrix:

$$\vec{\tilde{\phi}}(m,n) = \vec{\tilde{\varphi}}(m,n) \cdot Rot \qquad \text{Eq. 23}$$

where Rot is the rotation matrix calculated and applied during the generation of the matrix of points (e.g., Eq. 12). As described above, the matrix Rot may be stored during and used during phase unwrapping.

Continuing with method 1300, in other examples, at 1310, the lower dimensional plane is a zero plane. In some such examples, when using 3 amplitude modulation frequencies (i.e., K=3), the zero plane may be the X-Y, X-Z, or Y-Z Cartesian plane.

Figure 14:
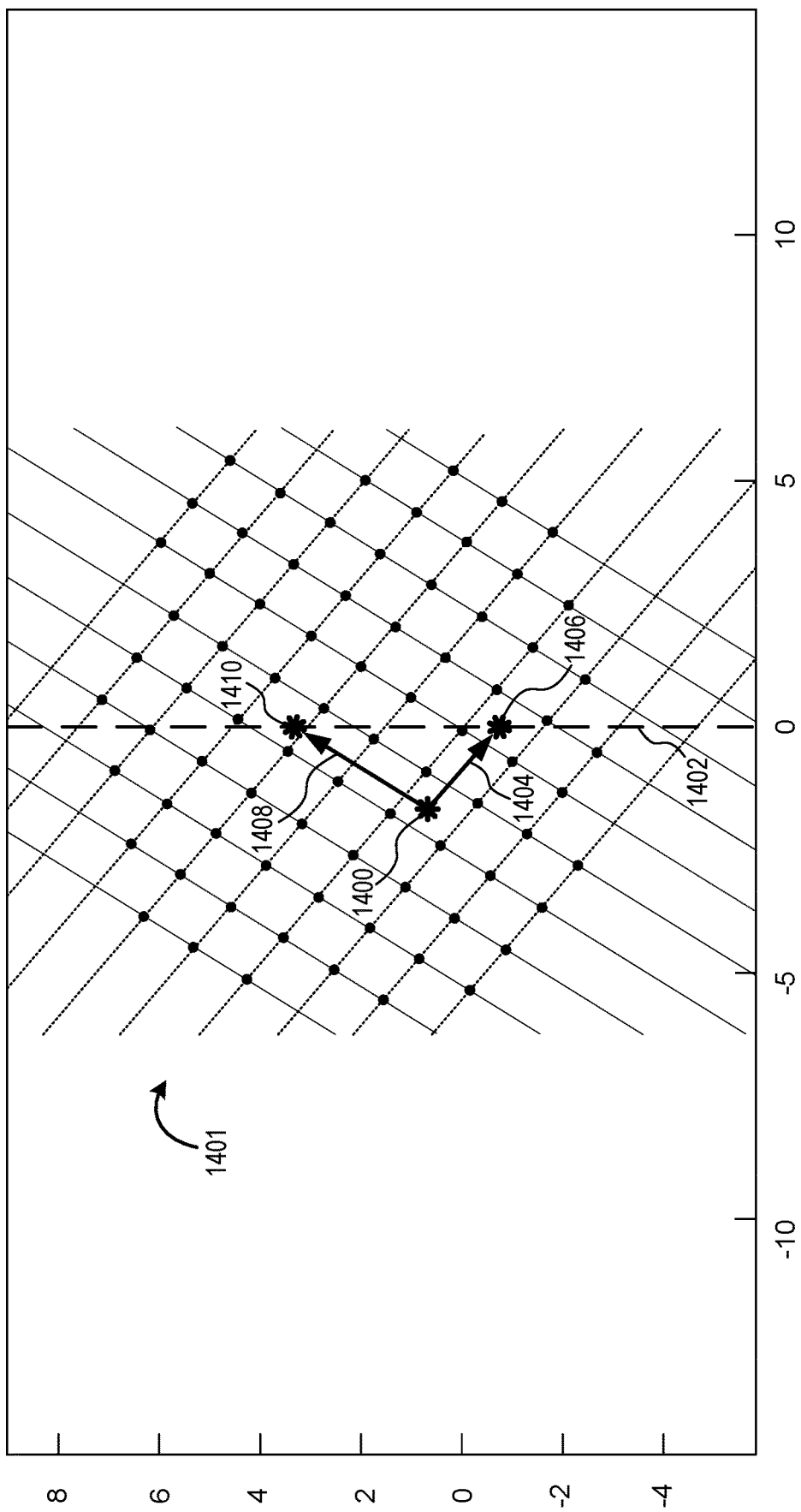
FIG. 14 graphically depicts an example calculation of independent terms for a noisy phase by determining the intersections of lines with a vertical axis in a lattice of projection points.

Method 1300 further comprises, at 1312, comparing the projected point to a predetermined matrix of points, and determining independent terms. FIG. 14 graphically depicts one example of determining independent terms by comparing location 1400 to a predetermined matrix of points 1401. In the example shown, location 1400 represents the intersection location of the projection line with the lower dimensional plane. Predetermined matrix of points 1401 also lies in the lower dimensional plane. The independent term for the projected noisy phase point is calculated as the intersection of the line with the vertical axis:

$$\tilde{\beta}_k(m,n) = \alpha_k^t \tilde{\phi}(1,m,n) - \tilde{\phi}(2,m,n) \qquad \text{Eq. 24}$$

where $\tilde{\phi}(1, m,n)$ denotes the horizontal component of the phase of the location of the projected phase point of pixel (m,n), $\tilde{\phi}(2, m,n)$ is the vertical component of the location, $\alpha_k^t$ is the slop for direction k, and $\tilde{\beta}_k$ is the independent term for direction k.

As seen in FIG. 14, location 1400 is projected in two directions to vertical line 1402. In a first direction 1404 parallel to the dotted lines, location 1400 is projected to intersect vertical line 1402 at a point 1406. Similarly, location 1400 is projected along a second direction 1408 parallel to the solid lines to intersect vertical line 1402 at point 1410. In the example shown, the first direction may yield a first independent term of 7, as point 1406 is closest to the $7^{th}$ dotted line counting from the top of the graph. Similarly, the second direction may yield a second independent term of 5 as point 1410 is closest to the $5^{th}$ solid line counting from the top. In other examples, the parallel lines may be sorted or numbered in reverse order.

In other examples, the independent terms may be found using any other suitable method. For example, a dot product between the 2D location 1400 and a vector orthogonal to direction 1404 (or 1408) may be used to determine the first (or second) independent term. In another example, given an appropriate basis set, a change-of-basis matrix operation may be performed to project the noisy phase point onto a plane normal to the reference phase vector and obtain the independent terms.

Referring again to FIG. 13, at 1314 the method comprises casting the phase point onto a look-up table and using the independent terms to determine a most likely phase order set. Once the independent terms for all projections are found, the value is subtracted from the smallest independent value previously calculated and divided by the distance between parallel lines. Then, rounding provides the element (i,j) of the look-up table. For example, when the matrix of points is 2-dimensional and there are two independent terms, the element is calculated as $$\begin{cases} \text{round}\left[\dfrac{\tilde{\beta}_1(m,n) - \beta_1^1}{\Delta_1}\right] + 1 = i \text{ with } i \in \{1, 2, \ldots, I\} \\ \text{round}\left[\dfrac{\tilde{\beta}_2(m,n) - \beta_2^1}{\Delta_2}\right] + 1 = j \text{ with } j \in \{1, 2, \ldots, J\} \end{cases} \qquad \text{Eq. 25}$$

where $\Delta_1$ is the distance between lines for the first set of parallel lines, $\Delta_2$ is the distance between lines for the second set of parallel lines, N is the lowest independent value of the first independent term, and $\beta_2^1$ is the lowest independent value of the second independent term. The values i and j are then used to reference a look-up table (e.g., look-up table 1200) and retrieve the element (i,j), as described above with respect to FIG. 12. Then, where the look-up table contains an index, the indexed location is accessed to obtain the phase order set. In other examples, the look-up table may contain the phase order set itself, rather than an index to a storage location of the corresponding phase order set. In other examples, the look-up table may comprise a higher dimensional table where each element is referenced by 3 or more independent terms.

After selecting a most likely phase order set, method 1300 further comprises, at 1316, calculating a depth (or radial distance) value for the pixel. The most likely phase order set is added to the wrapped phase and the distance is calculated as a weighted sum, which may reduce jitter and improve precision. For the case of three modulation frequencies, the depth calculation is $$d = \sum_{o=1}^{3} \xi_o \frac{\left[\tilde{\varphi}_o(m,n) + 2\pi n_o^l\right] c}{4\pi f_o} \qquad \text{Eq. 26}$$

where d is the depth value, $\tilde{\varphi}_o$ is the wrapped phase of frequency o, $n_o^l$ is the most likely phase order for frequency o, and $\xi_o$ is a normalized coefficient.

Figure 15A:
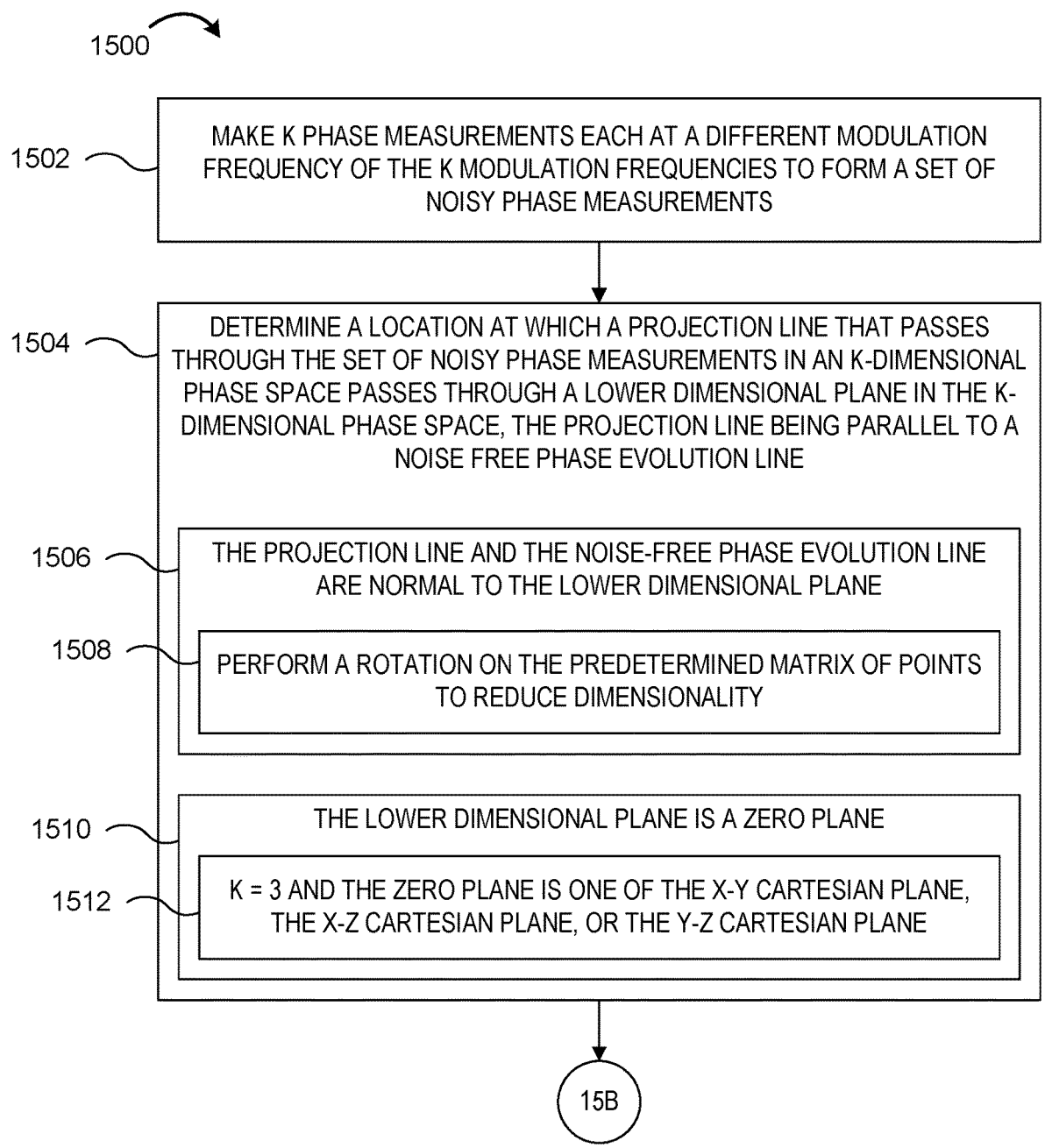
FIGS. 15A-15B show a flow diagram illustrating an example method for determining a distance value for a ToF pixel based upon a plurality of noisy phase measurements.
Figure 15B:
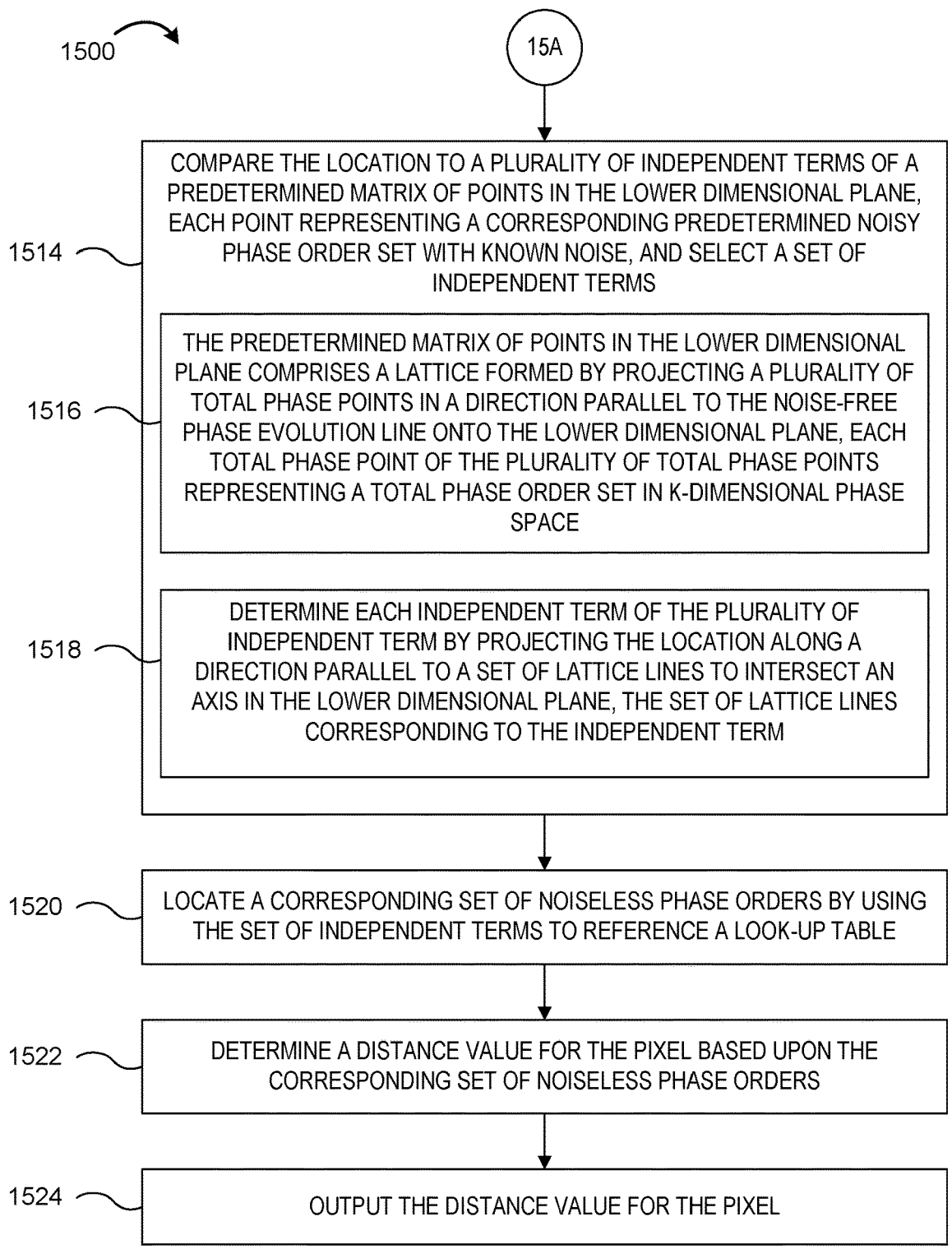

FIGS. 15A-B shows a flow diagram illustrating an example method 1500 for determining a distance value of a ToF pixel. Method 1500 comprises, at 1502, making K phase measurements, each at a different modulation frequency of K modulation frequencies to form a set of noisy phase measurements.

At 1504, method 1500 further comprises determining a location at which a projection line that passes through the set of noisy phase measurements in a K-dimensional phase space passes through a lower dimensional plane in the K-dimensional phase space, the projection line being parallel to a noise free phase evolution line. In some examples, at 1506, the projection line and the noise-free phase evolution line are normal to the lower dimensional plane. In some such examples, at 1508, method 1500 comprises performing a rotation on the predetermined matrix of points to reduce dimensionality. In other examples, at 1510, the lower dimensional plane is a zero plane. In some such examples, at 1512, K=3 and the zero plane is one of the X-Y Cartesian plane, the X-Z Cartesian plane, or the Y-Z Cartesian plane.

Continuing on FIG. 15B, method 1500 further comprises, at 1514, comparing the location to a plurality of independent terms of a predetermined matrix of points in the lower dimensional plane, each point representing a corresponding predetermined noisy phase order set with known noise, and selecting a set of independent terms. In some examples, at 1516, the predetermined matrix of points in the lower dimensional plane comprises a lattice formed by projecting a plurality of total phase points in a direction parallel to the noise-free phase evolution line onto the lower dimensional plane, each total phase point of the plurality of total phase points representing a total phase order set in K-dimensional phase space. In some examples, at 1518, the method comprises determining each independent term of the plurality of independent term by projecting the location along a direction parallel to a set of lattice lines to intersect an axis in the lower dimensional plane, the set of lattice lines corresponding to the independent term.

Method 1500 further comprises, at 1520, locating a corresponding set of noiseless phase orders by using the set of independent terms to reference a look-up table. As described above, in some examples, the elements of the look-up table may provide an index number of a phase order set within a series of phase order sets. Method 1500 further comprises, at 1522, determining a distance value for the pixel based upon the corresponding set of noiseless phase orders, and at 1524, outputting the distance value for the pixel.

Figure 16:
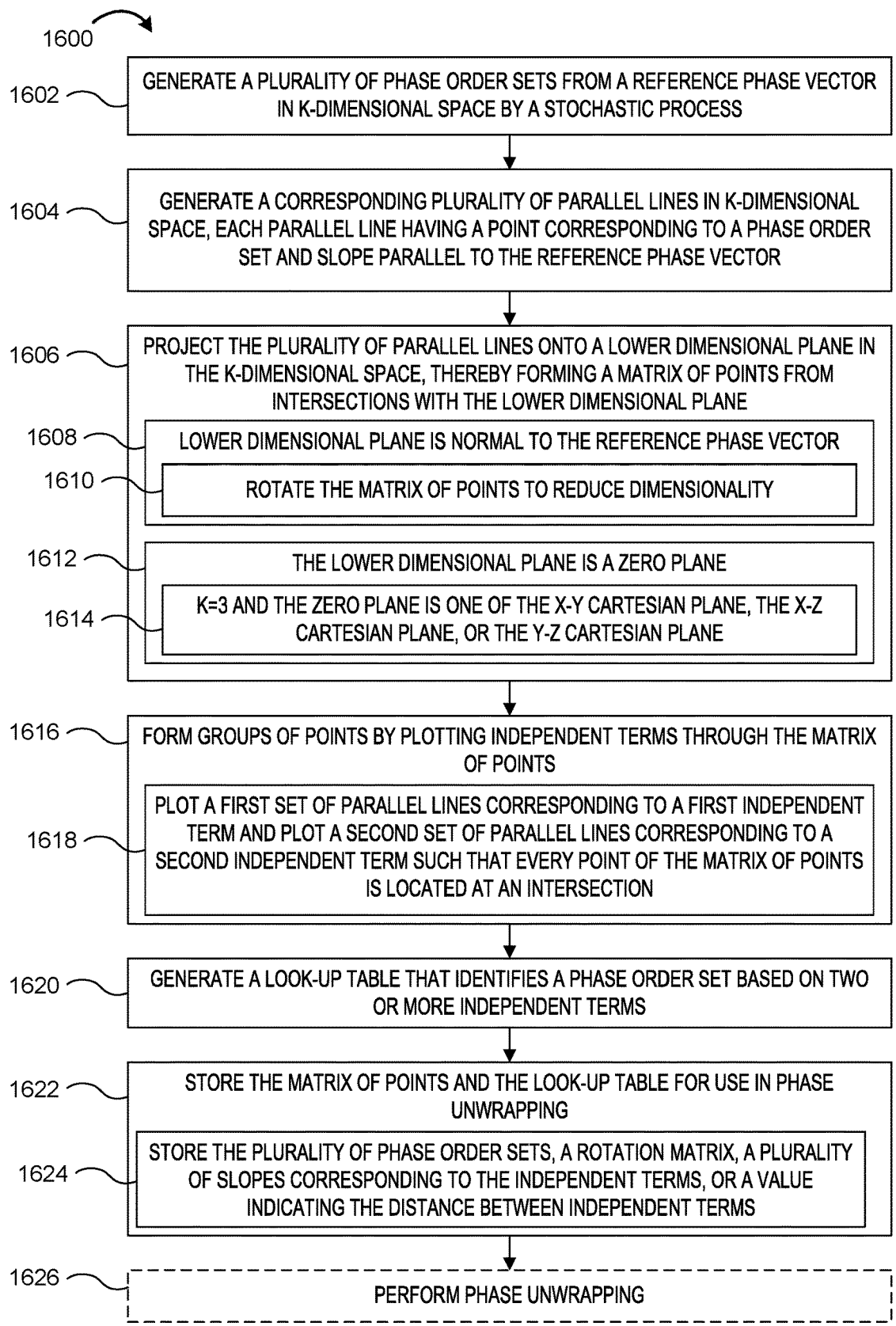
FIG. 16 is a flow diagram illustrating an example method for generating a matrix of points for use in phase unwrapping.

FIG. 16 shows a flowchart illustrating an example method 1600 for generating a matrix of points and a look-up table for use in phase unwrapping. At 1602, method 1600 comprises generating a plurality of phase order sets from a reference phase vector in K-dimensional space by a stochastic process, the reference phase vector describing an evolution of phase with distance for K frequencies of amplitude modulated light. At 1604, the method comprises, based on the plurality of phase order sets, generating a corresponding plurality of parallel lines in K-dimensional space, each parallel line having a point corresponding to a phase order set and a slope parallel to the reference phase vector.

Method 1600 further comprises, at 1606, projecting the plurality of parallel lines onto a lower dimensional plane in the K-dimensional space, thereby forming a matrix of points from intersections of the parallel lines with the lower dimensional plane. In some examples, at 1608, the lower dimensional plane is normal to the reference phase vector. In some such examples, at 1610, the method comprises rotating the matrix of points to reduce dimensionality. In other examples, at 1612, the lower dimensional plane is a zero plane and in some such examples, at 1614, K=3 and the zero plane is one of the X-Y Cartesian plane, the X-Z Cartesian plane, or the Y-Z Cartesian plane.

Method 1600 further comprises, at 1616, forming groups of points by plotting independent terms through the matrix of points. In some examples, at 1618, plotting independent terms through the matrix of points comprises plotting a first set of parallel lines corresponding to a first independent term and plotting a second set of parallel lines corresponding to a second independent term such that every point of the matrix of points is located at an intersection between a line of the first set of parallel lines and a line of the second set of parallel lines.

Method 1600 further comprises, at 1620, generating a look-up table that identifies a phase order set based on two or more independent terms. At 1622 the method comprises storing the matrix of points and the look-up table for use in phase unwrapping. In some examples, at 1624, the plurality of phase order sets, a rotation matrix, a plurality of slopes, and/or a value indicating the distance between independent terms is stored along with the matrix of points and the look-up table.

In some examples, at 1626, method 1600 further comprises performing phase unwrapping using the stored matrix of points and the look-up table to calculate a depth value for a pixel. As such, method 1600 may utilize method 1300 or method 1500.

The examples disclosed herein may achieve improved efficiency with fast computation and low memory usage compared to other phase unwrapping methods. Further, the disclosed examples may utilize fast operations on processors (e.g., multiplication and sorting) while avoiding interpolations. As such, the examples involve low-level computations that can be performed without a high-powered graphical processing unit (GPU).

In some embodiments, the methods and processes described herein may be tied to a computing system of one or more computing devices. In particular, such methods and processes may be implemented as a computer-application program or service, an application-programming interface (API), a library, and/or other computer-program product.

Figure 17:
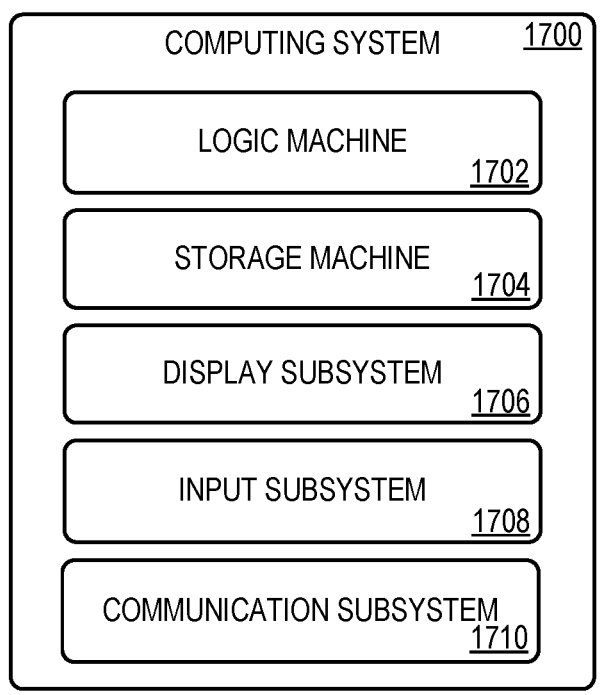
FIG. 17 shows a block diagram of an example computing system.

FIG. 17 schematically shows a non-limiting embodiment of a computing system 1700 that can enact one or more of the methods and processes described above. Computing system 1700 is shown in simplified form. Computing system 1700 may take the form of one or more personal computers, server computers, tablet computers, home-entertainment computers, network computing devices, gaming devices, mobile computing devices, mobile communication devices (e.g., smart phone), and/or other computing devices.

Computing system 1700 includes a logic machine 1702 and a storage machine 1704 storage machine 1704. Computing system 1700 may optionally include a display subsystem 1706 display subsystem 1706, input subsystem 1708, communication subsystem 1710, and/or other components not shown in FIG. 17.

Logic machine 1702 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 1704 Storage machine 1704 includes one or more physical devices configured to hold instructions executable by the logic machine to implement the methods and processes described herein. When such methods and processes are implemented, the state of storage machine 1704 may be transformed—e.g., to hold different data.

Storage machine 1704 may include removable and/or built-in devices. Storage machine 1704 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1704 may include volatile, nonvolatile, dynamic, static, read/write, read-only, random-access, sequential-access, location-addressable, file-addressable, and/or content-addressable devices.

It will be appreciated that storage machine 1704 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1702 and storage machine 1704 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1700 implemented to perform a particular function. In some cases, a module, program, or engine may be instantiated via logic machine 1702 executing instructions held by storage machine 1704. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 1706 may be used to present a visual representation of data held by storage machine 1704. This visual representation may take the form of a graphical user interface (GUI). As the herein described methods and processes change the data held by the storage machine, and thus transform the state of the storage machine, the state of display subsystem 1706 may likewise be transformed to visually represent changes in the underlying data. Display subsystem 1706 may include one or more display devices utilizing virtually any type of technology. Such display devices may be combined with logic machine 1702 and/or storage machine 1704 in a shared enclosure, or such display devices may be peripheral display devices.

When included, input subsystem 1708 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1710 may be configured to communicatively couple computing system 1700 with one or more other computing devices. Communication subsystem 1710 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1700 to send and/or receive messages to and/or from other devices via a network such as the Internet.

Another example provides a computing system, comprising a depth sensor comprising a plurality of pixels, each pixel configured to sense light, an illumination source configured to output light, a logic machine, and a storage machine holding instructions executable by the logic machine to control the illumination source to output amplitude-modulated light at K modulation frequencies, where K is an integer greater than or equal to two, and for each pixel of the plurality of pixels, make K phase measurements each at a different modulation frequency of the K modulation frequencies to form a set of noisy phase measurements, determine a location at which a projection line that passes through the set of noisy phase measurements in an K-dimensional phase space passes through a lower dimensional plane in the K-dimensional phase space, the projection line being parallel to a noise free phase evolution line, compare the location to a plurality of independent terms of a predetermined matrix of points in the lower dimensional plane, each point representing a corresponding predetermined noisy phase order set with known noise, and select a set of independent terms, locate a corresponding set of noiseless phase orders by using the set of independent terms to reference a look-up table, determine a distance value for the pixel based upon the corresponding set of noiseless phase orders, and output the distance value for the pixel. In some such examples, the projection line and the noise-free phase evolution line are normal to the lower dimensional plane. Additionally or alternatively, in some examples the instructions are further executable to perform a rotation on the predetermined matrix of points to reduce dimensionality. Additionally or alternatively, in some examples the lower dimensional plane comprises a zero plane. Additionally or alternatively, in some examples K=3 and the zero plane is one of the X-Y Cartesian plane, the X-Z Cartesian plane, or the Y-Z Cartesian plane. Additionally or alternatively, in some examples the predetermined matrix of points in the lower dimensional plane comprises a lattice formed by projecting a plurality of total phase points in a direction parallel to the noise-free phase evolution line onto the lower dimensional plane, each total phase point of the plurality of total phase points representing a total phase order set in K-dimensional phase space. Additionally or alternatively, in some examples the instructions are executable to determine each term of the plurality of independent term by projecting the location along a direction parallel to a set of lattice lines to intersect an axis in the lower dimensional plane, the set of lattice lines corresponding to the independent term.

Another example provides a method of generating a matrix of points and a look-up table for use in phase unwrapping, the method comprising generating a plurality of phase order sets from a reference phase vector in K-dimensional space by a stochastic process, the reference phase vector describing an evolution of phase with distance for K frequencies of amplitude modulated light, based on the plurality of phase order sets, generating a corresponding plurality of parallel lines in K-dimensional space, each parallel line having a point corresponding to a phase order set and a slope parallel to the reference phase vector, projecting the plurality of parallel lines onto a lower dimensional plane in the K-dimensional space, thereby forming a matrix of points from intersections of the parallel lines with the lower dimensional plane, plotting independent terms through the matrix of points, generating a look-up table that identifies a phase order set based on two or more independent terms, and storing the matrix of points and the look-up table for use in phase unwrapping. In some such examples, the method further comprises performing phase unwrapping by receiving a noisy phase point comprising K phase measurements from a time-of-flight pixel, determining a location at which a projection line that passes through the noisy phase point in K-dimensional phase space passes through the lower dimensional plane in the K-dimensional phase space, the projection line being parallel to the reference phase vector, comparing the location to the independent terms plotted through the matrix of points and selecting a set of independent terms, determining a phase order set by using the set of independent terms to reference the look-up table, determining a distance value based on the phase order set, and outputting the distance value for the time-of-flight pixel. Additionally or alternatively, in some examples, comparing the location to the independent terms comprises determining a first independent term by projecting the location along a first direction to intersect an axis, and determining a second independent term by projecting the location along a second direction to intersect the axis. Additionally or alternatively, in some examples the lower dimensional plane is normal to the reference phase vector. Additionally or alternatively, in some examples the method further comprises rotating the matrix of points to reduce dimensionality. Additionally or alternatively, in some examples the lower dimensional plane is a zero plane. Additionally or alternatively, in some examples K=3 and the zero plane is one of the X-Y Cartesian plane, the X-Z Cartesian plane, or the Y-Z Cartesian plane. Additionally or alternatively, in some examples plotting independent terms through the matrix of points comprises plotting a first set of parallel lines corresponding to a first independent term and plotting a second set of parallel lines corresponding to a second independent term such that every point of the matrix of points is located at an intersection between a line of the first set of parallel lines and a line of the second set of parallel lines. Additionally or alternatively, in some examples the method further comprises storing one or more of the plurality of phase order sets, a rotation matrix, a plurality of slopes corresponding to the independent terms, or a value indicating the distance between independent terms along with the matrix of points and the look-up table.

Another example provides a computing system, comprising a depth sensor comprising a plurality of pixels, each pixel configured to sense light, an illumination source configured to output light, a logic machine, and a storage machine holding instructions executable by the logic machine to control the illumination source to output amplitude-modulated light at K modulation frequencies, where K is an integer greater than or equal to two, and for each pixel of the plurality of pixels make K phase measurements each at a different modulation frequency of the K modulation frequencies to form a set of noisy phase measurements, determine a location at which a projection line that passes through the set of noisy phase measurements in a K-dimensional phase space passes through a zero plane in the K-dimensional phase space, the projection line being parallel to a noise-free phase evolution line, compare the location to a plurality of independent terms of a predetermined matrix of points in the zero plane, each point representing a corresponding predetermined noisy phase order set with known noise, and select a set of independent terms, locate a corresponding set of noiseless phase orders in a look-up table by using the set of independent terms to reference the look-up table, determine a distance value for the pixel based upon the corresponding set of noiseless phase orders, and output the distance value for the pixel. In some such examples, the predetermined matrix of points in the zero plane comprises a lattice formed by projecting a plurality of total phase points in a direction parallel to the noise-free phase evolution line onto the zero plane, each total phase point of the plurality of total phase points representing a total phase order set in K-dimensional phase space. Additionally or alternatively, in some examples K=3 and the zero plane is one of the X-Y Cartesian plane, the X-Z Cartesian plane, or the Y-Z Cartesian plane. Additionally or alternatively, in some examples the instructions are executable to determine each independent term of the plurality of independent terms by projecting the location along a direction parallel to a set of lattice lines to intersect an axis in the lower dimensional plane, the set of lattice lines corresponding to the independent term, and select the set of independent terms based on a location of axis intersection.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system, comprising:
a depth sensor comprising a plurality of pixels, each pixel configured to sense light;
an illumination source configured to output light;
a logic machine; and
a storage machine holding instructions executable by the logic machine to control the illumination source to output amplitude-modulated light at K modulation frequencies, where K is an integer greater than or equal to two, and for each pixel of the plurality of pixels:
make K phase measurements each at a different modulation frequency of the K modulation frequencies to form a set of noisy phase measurements,
determine a location at which a projection line that passes through the set of noisy phase measurements in an K-dimensional phase space also passes through a lower dimensional plane in the K-dimensional phase space, the projection line being parallel to a noise free phase evolution line,
compare the location to a plurality of independent terms of a predetermined matrix of points in the lower dimensional plane, each point representing a corresponding predetermined noisy phase order set with known noise, and select a set of independent terms,
locate a corresponding set of noiseless phase orders by using the set of independent terms to reference a look-up table,
determine a distance value for the pixel based upon the corresponding set of noiseless phase orders, and
output the distance value for the pixel.

2. The computing system of claim 1, wherein the projection line and the noise-free phase evolution line are normal to the lower dimensional plane.

3. The computing system of claim 2, wherein the instructions are further executable to perform a rotation on the predetermined matrix of points to reduce dimensionality.

4. The computing system of claim 1, wherein the lower dimensional plane is a zero plane.

5. The computing system of claim 4, wherein K=3 and the zero plane is one of the X-Y Cartesian plane, the X-Z Cartesian plane, or the Y-Z Cartesian plane.

6. The computing system of claim 1, wherein the predetermined matrix of points in the lower dimensional plane comprises a lattice formed by projecting a plurality of total phase points in a direction parallel to the noise-free phase evolution line onto the lower dimensional plane, each total phase point of the plurality of total phase points representing a total phase order set in K-dimensional phase space.

7. The computing system of claim 1, wherein the instructions are executable to determine each term of the plurality of independent terms by projecting the location along a direction parallel to a set of lattice lines to intersect an axis in the lower dimensional plane, the set of lattice lines corresponding to the independent term.

8. A computing system, comprising:
a depth sensor comprising a plurality of pixels, each pixel configured to sense light;
an illumination source configured to output light;
a logic machine; and
a storage machine holding instructions executable by the logic machine to
control the illumination source to output amplitude-modulated light at K modulation frequencies, where K is an integer greater than or equal to two, and for each pixel of the plurality of pixels:
make K phase measurements each at a different modulation frequency of the K modulation frequencies to form a set of noisy phase measurements,
determine a location at which a projection line that passes through the set of noisy phase measurements in a K-dimensional phase space passes through a zero plane in the K-dimensional phase space, the projection line being parallel to a noise-free phase evolution line,
compare the location to a plurality of independent terms of a predetermined matrix of points in the zero plane, each point representing a corresponding predetermined noisy phase order set with known noise, and select a set of independent terms,
locate a corresponding set of noiseless phase orders in a look-up table by using the set of independent terms to reference the look-up table,
determine a distance value for the pixel based upon the corresponding set of noiseless phase orders, and
output the distance value for the pixel.

9. The computing system of claim 8, wherein the predetermined matrix of points in the zero plane comprises a lattice formed by projecting a plurality of total phase points in a direction parallel to the noise-free phase evolution line onto the zero plane, each total phase point of the plurality of total phase points representing a total phase order set in K-dimensional phase space.

10. The computing system of claim 8, wherein K=3 and the zero plane is one of the X-Y Cartesian plane, the X-Z Cartesian plane, or the Y-Z Cartesian plane.

11. The computing system of claim 8, wherein the instructions are executable to determine each independent term of the plurality of independent terms by projecting the location along a direction parallel to a set of lattice lines to intersect an axis in the lower dimensional plane, the set of lattice lines corresponding to the independent term, and select the set of independent terms based on a location of axis intersection.

* * * * *